United States Patent
Hayashi et al.

(10) Patent No.: US 8,738,685 B2
(45) Date of Patent: May 27, 2014

(54) CONTENT DISTRIBUTED-STORAGE SYSTEM, FRAME IMAGE OBTAINING METHOD, NODE DEVICE, AND RECORDING MEDIUM ON WHICH NODE PROCESSING PROGRAM IS RECORDED

(75) Inventors: Koichi Hayashi, Nagoya (JP); Kentaro Ushiyama, Nagoya (JP); Hideki Matsuo, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1098 days.

(21) Appl. No.: 12/292,144

(22) Filed: Nov. 12, 2008

(65) Prior Publication Data

US 2009/0083809 A1   Mar. 26, 2009

Related U.S. Application Data

(63) Continuation-in-part of application No. PCT/JP2007/064687, filed on Jul. 26, 2007.

(30) Foreign Application Priority Data

Aug. 21, 2006  (JP) ................. 2006-224485
Aug. 21, 2006  (JP) ................. 2006-224486
Aug. 21, 2006  (JP) ................. 2006-224487

(51) Int. Cl.
*G06F 15/16*   (2006.01)
(52) U.S. Cl.
USPC ........................................................ 709/203
(58) Field of Classification Search
USPC ........................................................ 709/203
See application file for complete search history.

(56) References Cited

U.S. PATENT DOCUMENTS

| 6,993,536 B2 | 1/2006 | Yamanaka |
| 7,433,867 B2 | 10/2008 | Yamanaka |
| 2004/0221322 A1* | 11/2004 | Shen et al. ............ 725/135 |
| 2006/0059203 A1* | 3/2006 | Yamanaka ............ 707/104.1 |
| 2006/0256852 A1* | 11/2006 | Prakash et al. ........ 375/240.01 |

FOREIGN PATENT DOCUMENTS

| JP | A-2001-266494 | 9/2001 |
| JP | A-2005-184783 | 7/2005 |
| JP | A-2006-059133 | 3/2006 |

(Continued)

OTHER PUBLICATIONS

Office Action issued in JP Application No. 2006-224485 on May 17, 2011 (with English translation).

(Continued)

*Primary Examiner* — Maceeh Anwari
(74) *Attorney, Agent, or Firm* — Oliff & Berridge, PLC

(57) ABSTRACT

In a content distributed-storage system in which divided content data obtained by dividing content data of a single unit having a plurality of pieces of frame image data into a plurality of pieces is stored so as to be distributed to a plurality of node devices, unique identification information is assigned to each of the divided content data, each of the node devices can obtain the divided content data on the basis of the identification information.

In the system, content catalog information having the identification information of at least one piece of the divided content data and key frame information including information indicative of an offset position of the frame image data in each of the divided content data, is stored. An instruction related to playback of the content data from the user is received.

27 Claims, 33 Drawing Sheets

(56) References Cited

FOREIGN PATENT DOCUMENTS

| | | |
|---|---|---|
| JP | A-2006-178782 | 7/2006 |
| JP | A-2006-197400 | 7/2006 |
| JP | A-2006-525755 | 11/2006 |
| WO | WO 2004/100162 A2 | 11/2004 |

OTHER PUBLICATIONS

Office Action issued in JP Application No. 2006-244486 on May 17, 2011 (with English translation).
Office Action issued in JP Application No. 2006-224487 on May 17, 2011 (with English translation).

* cited by examiner

FIG. 2

ROUTING TABLE USING DHT OF NODE N2

| | AREA 0XX<br>NODE ID:002 | AREA 1XX<br>NODE ID:122 | AREA 2XX<br>NODE ID:221 | AREA 3XX<br>NODE ID:301 |
|---|---|---|---|---|
| LEVEL 1 | IP ADDRESS AND PORT NUMBER OF NODE N3 | IP ADDRESS AND PORT NUMBER OF NODE N2 | IP ADDRESS AND PORT NUMBER OF NODE N21 | IP ADDRESS AND PORT NUMBER OF NODE N5 |
| | AREA 10X<br>NODE ID:102 | AREA 11X<br>NODE ID:112 | AREA 12X<br>NODE ID:122 | AREA 13X<br>NODE ID:131 |
| LEVEL 2 | IP ADDRESS AND PORT NUMBER OF NODE N25 | IP ADDRESS AND PORT NUMBER OF NODE N8 | IP ADDRESS AND PORT NUMBER OF NODE N2 | IP ADDRESS AND PORT NUMBER OF NODE N10 |
| | NODE ID:120 | NODE ID:121 | NODE ID:122 | |
| LEVEL 3 | IP ADDRESS AND PORT NUMBER OF NODE N22 | IP ADDRESS AND PORT NUMBER OF NODE N32 | IP ADDRESS AND PORT NUMBER OF NODE N2 | (UNREGISTERED) |

ID SPACE OF DHT

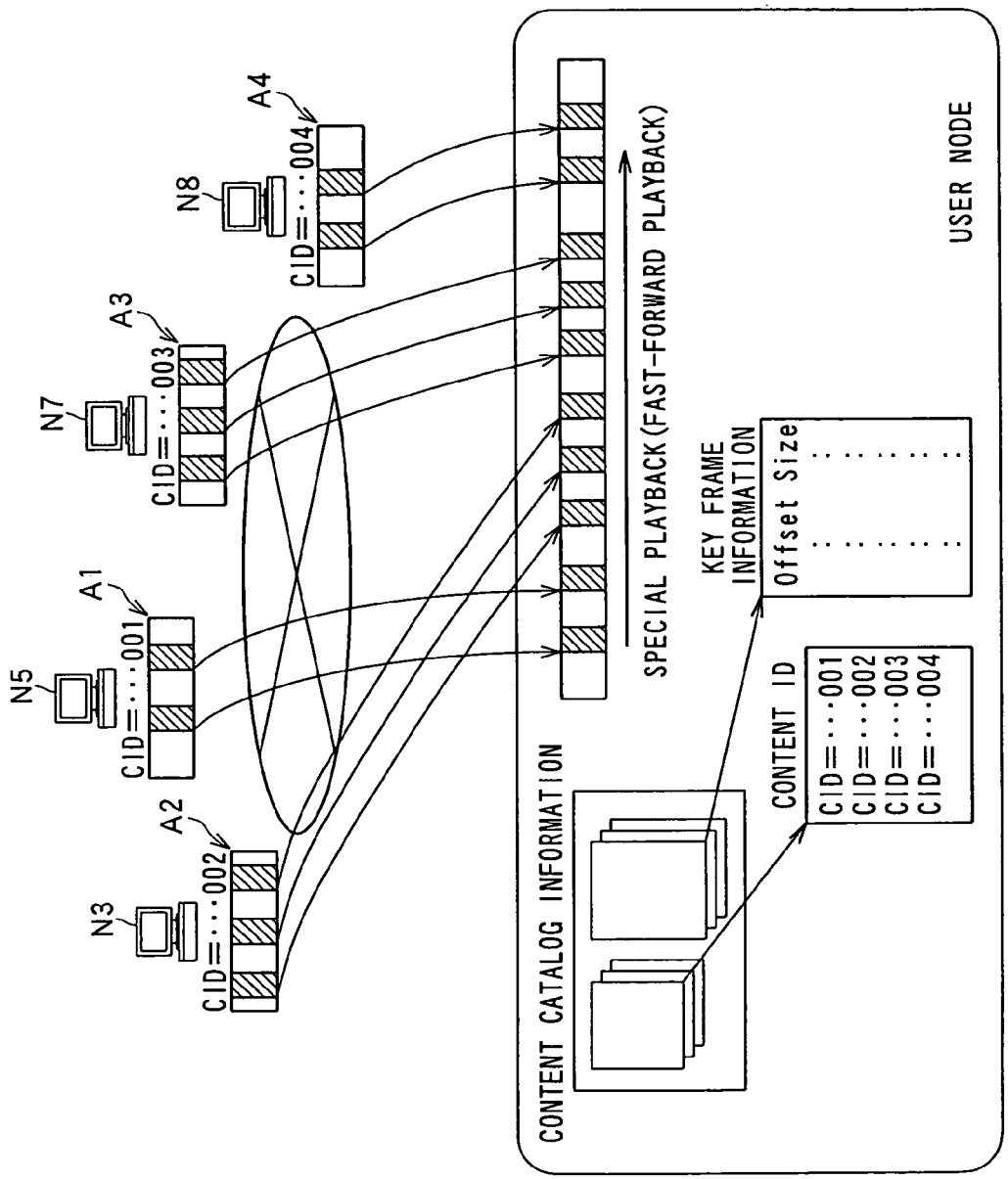

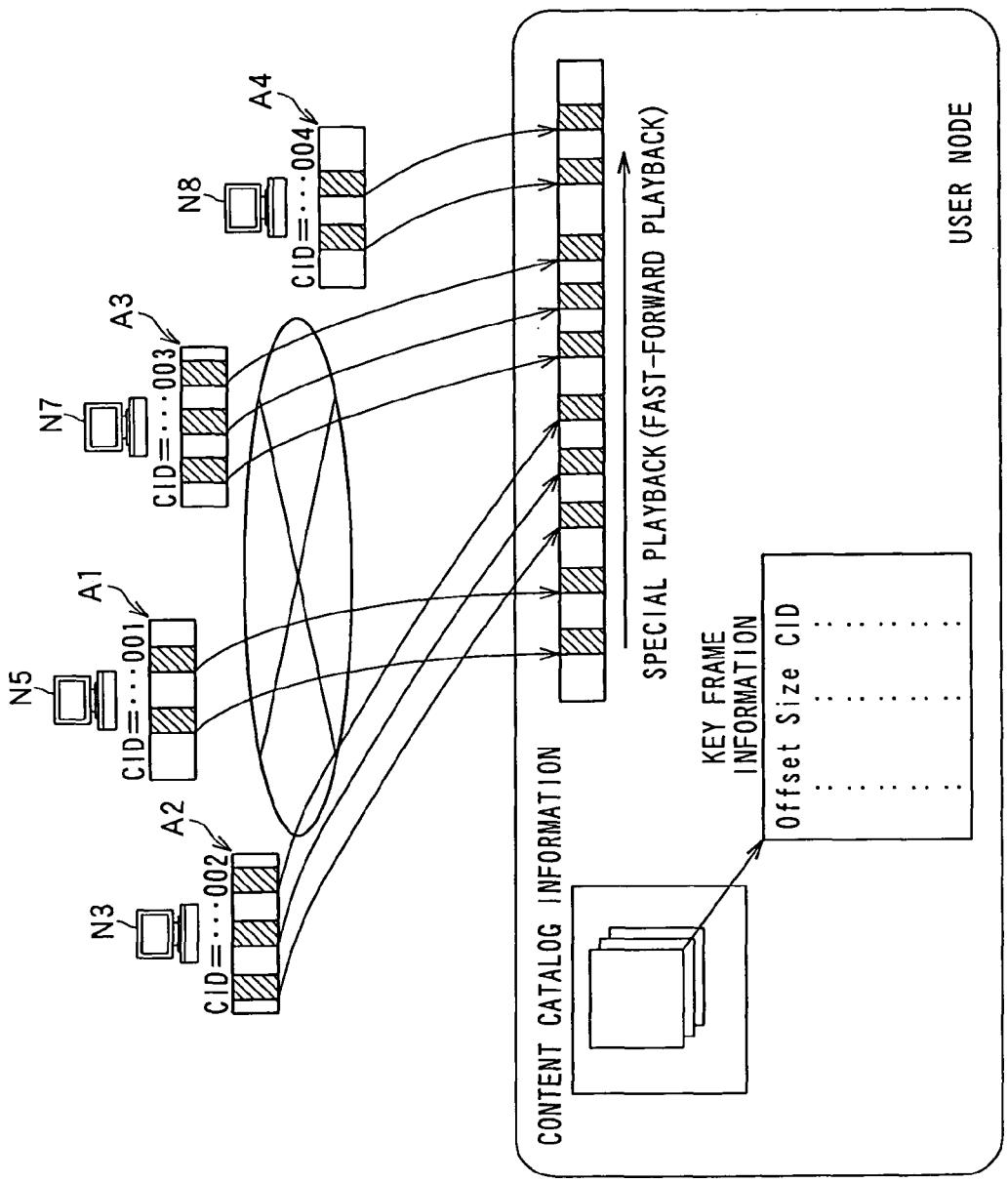

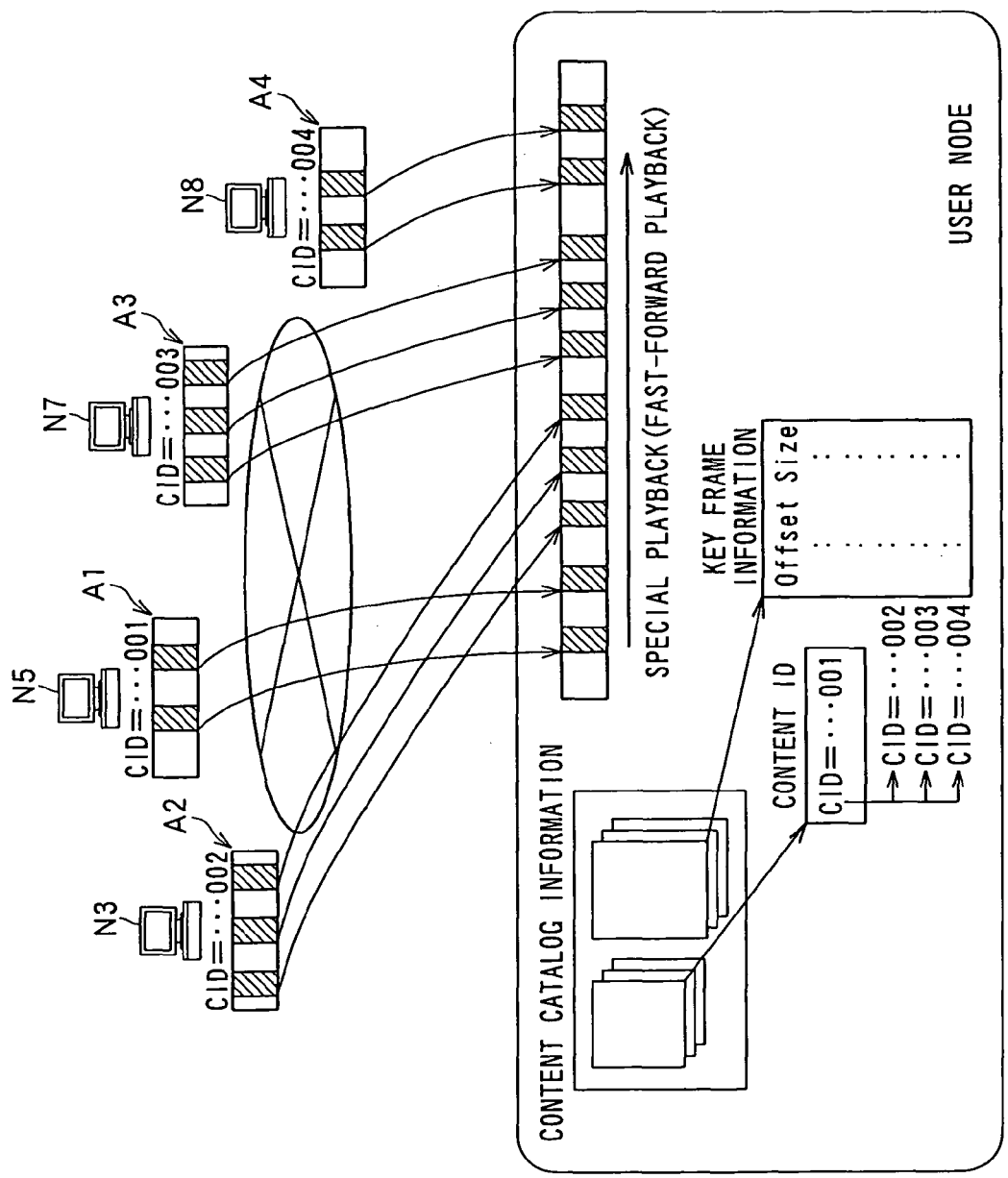

FIG.13
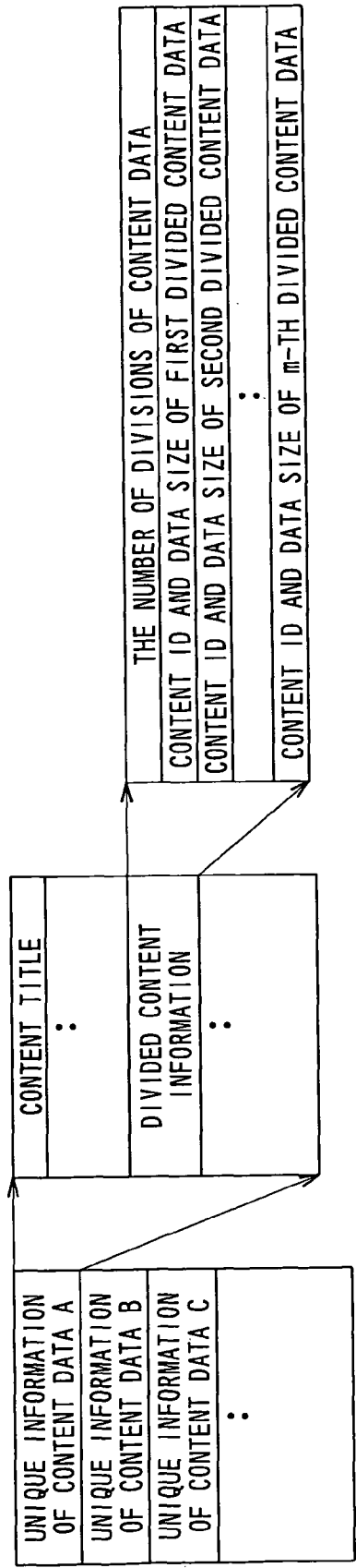
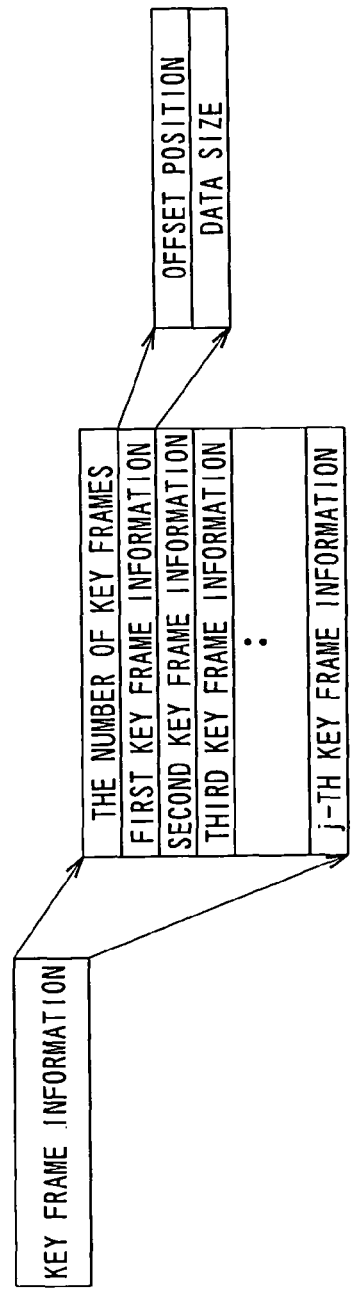

FIG. 14
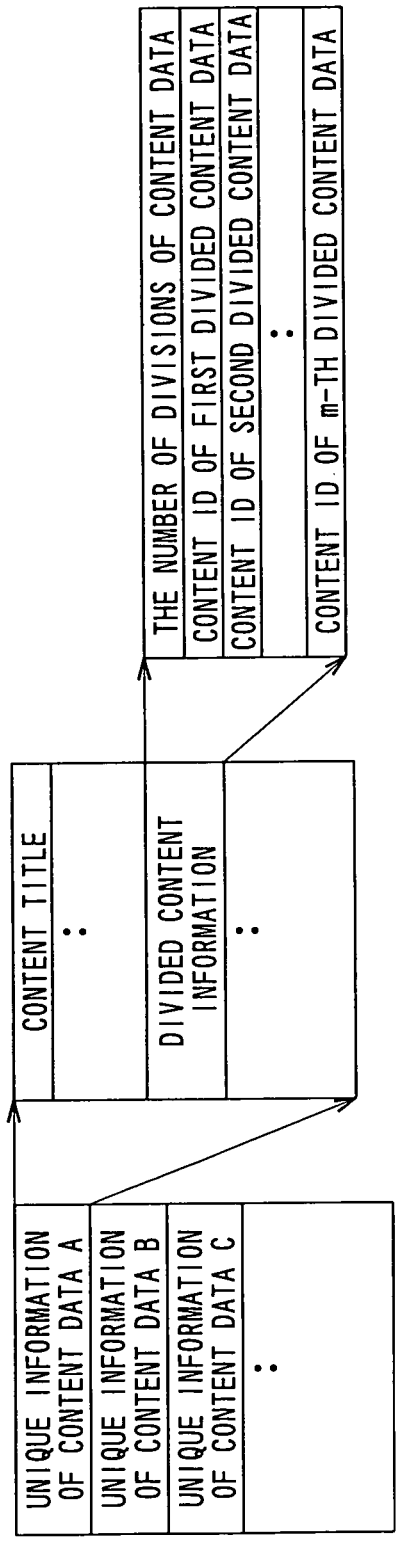
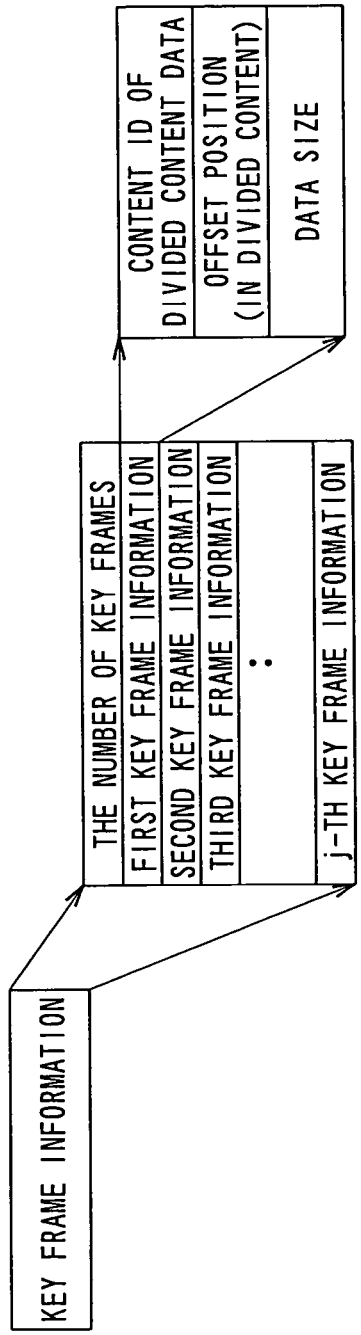

FIG.15
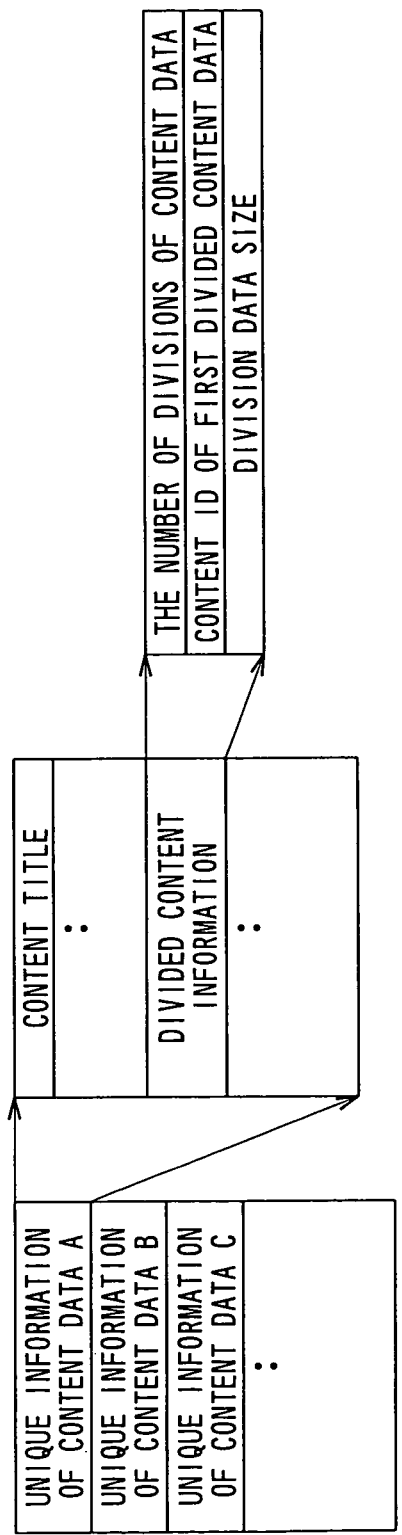
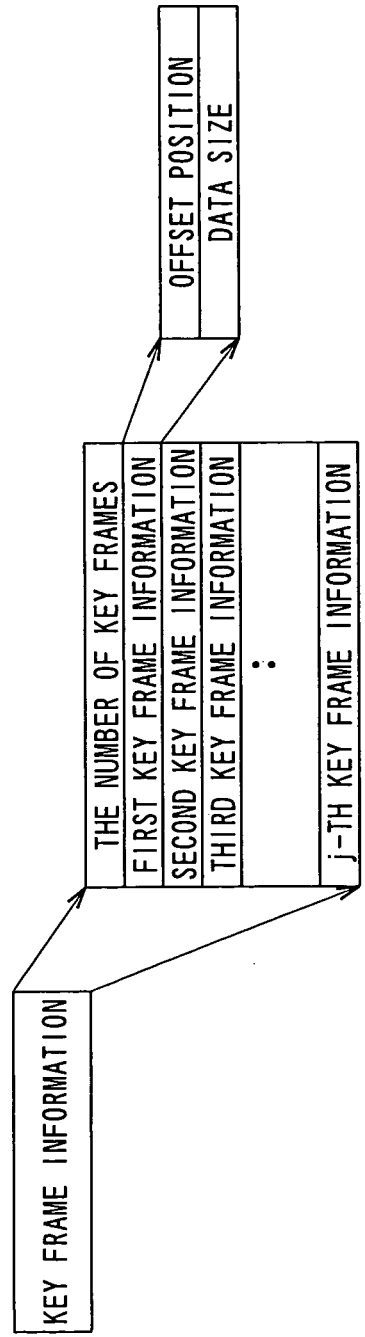

FIG. 20
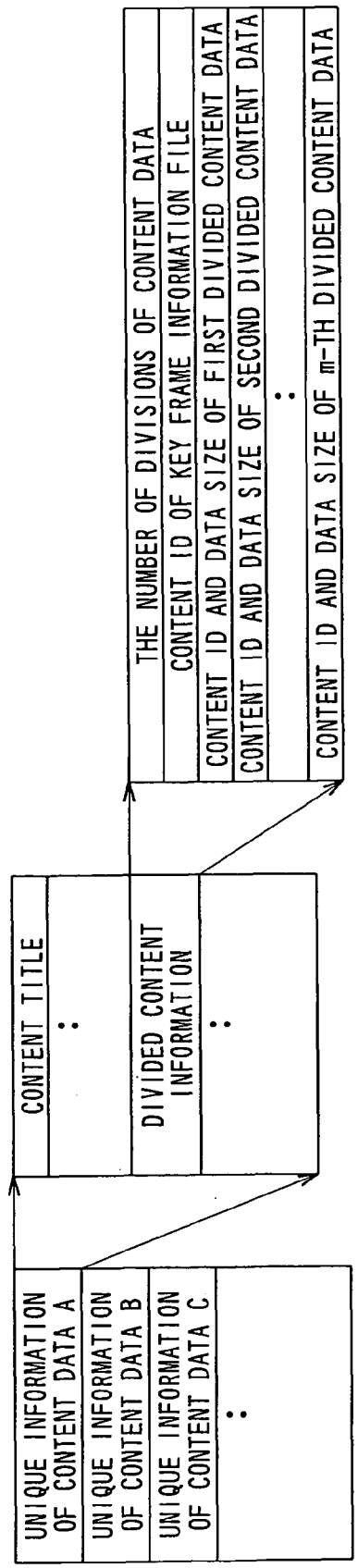
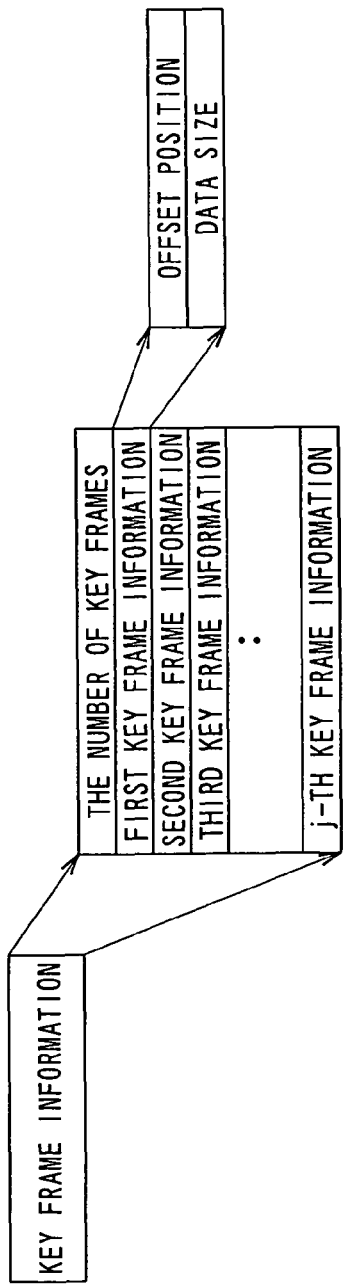

FIG. 21
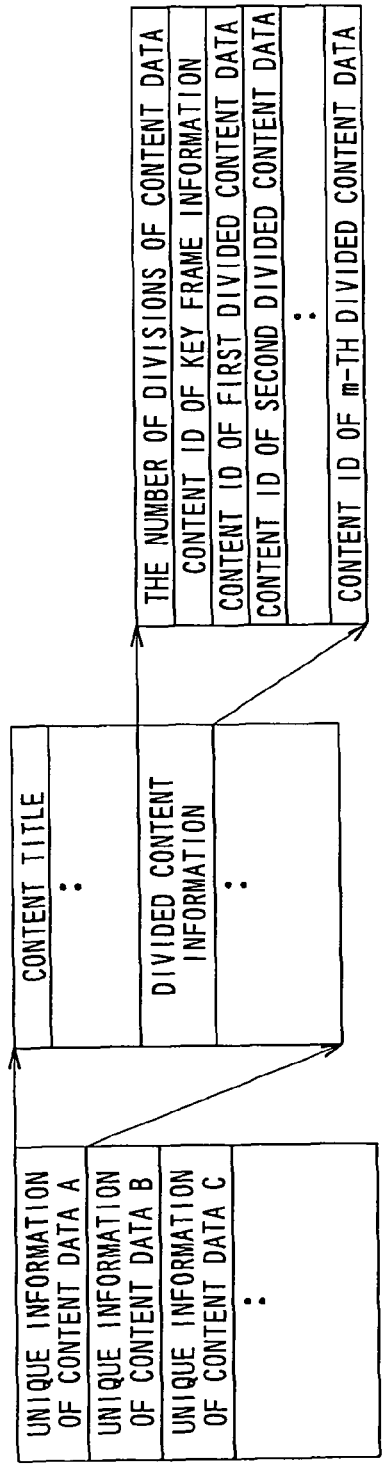
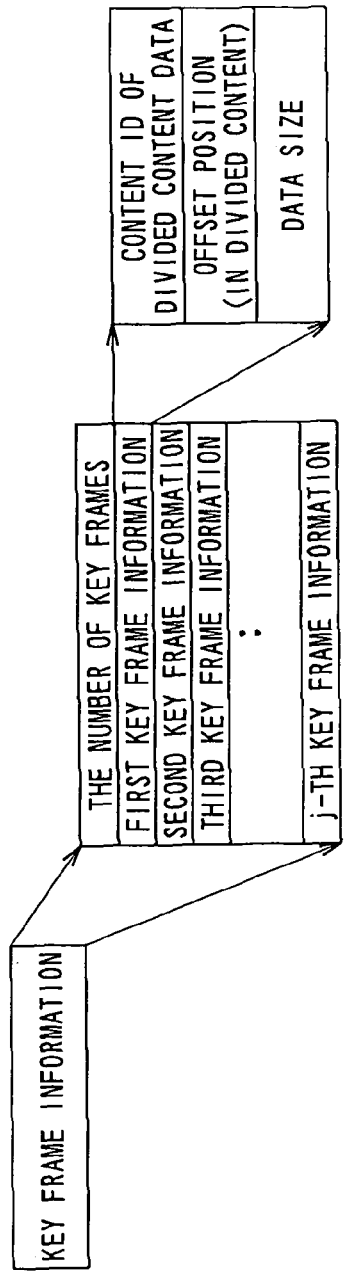

FIG. 22
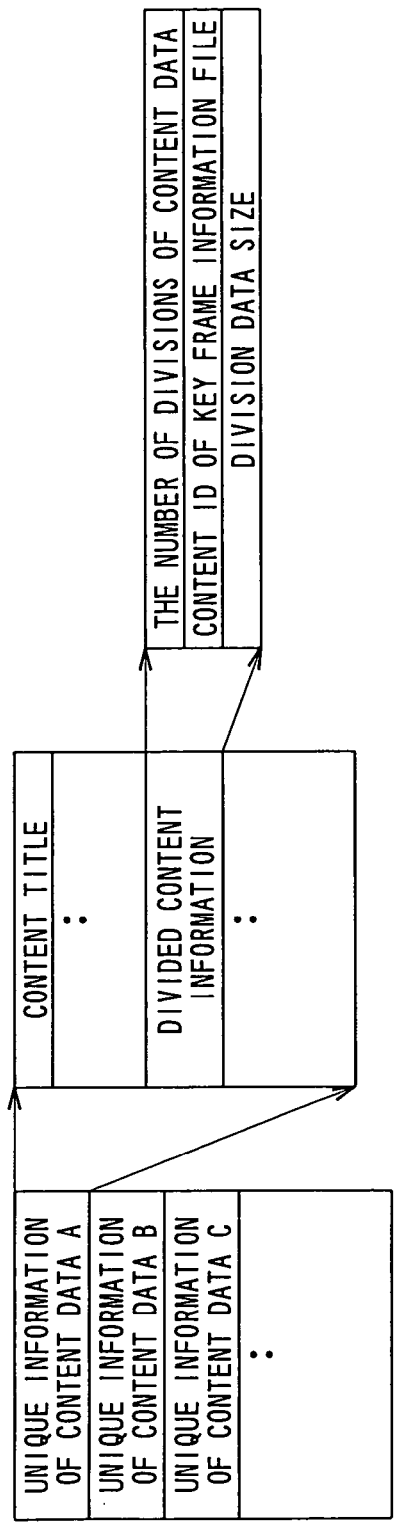
CONTENT CATALOG INFORMATION (STRUCTURE EXAMPLE 3)
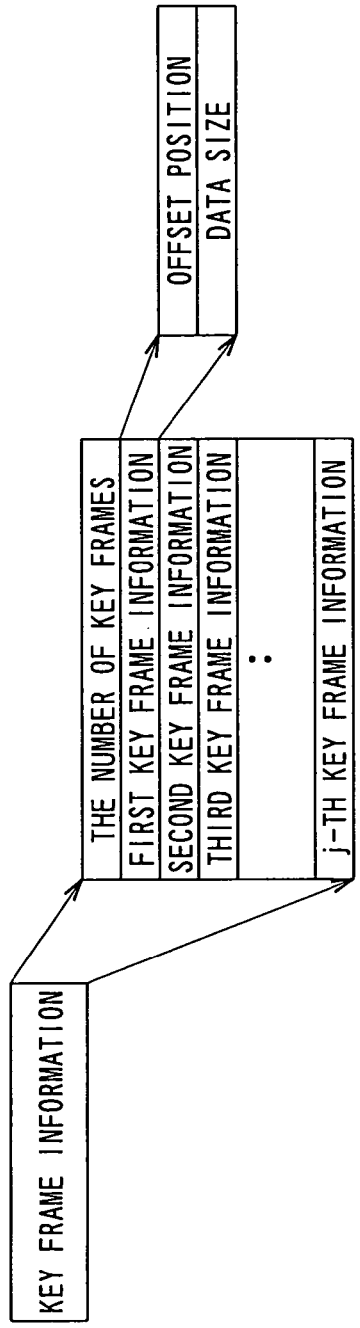
KEY FRAME INFORMATION FILE (STRUCTURE EXAMPLE 3)

CONTENT DISTRIBUTED-STORAGE SYSTEM, FRAME IMAGE OBTAINING METHOD, NODE DEVICE, AND RECORDING MEDIUM ON WHICH NODE PROCESSING PROGRAM IS RECORDED

This application is a Continuation-in-Part of PCT/JP2007/064687 filed on Jul. 26, 2007. The entire disclosure of each of the Japanese Patent Application Nos. 2006-224485, 2006-224486, and 2006-224487, including the specification, the scope of claims, drawings, and abstract, filed on Aug. 21, 2006 is incorporated herein by reference in its entirety.

BACKGROUND OF THE INVENTION

1. Field of the Invention

The present invention relates to the technical field of a peer-to-peer (P2P) communication system having a plurality of node devices capable of performing communication with each other via a network.

2. Discussion of the Related Art

A content distributed-storage system for storing content data in a plurality of node devices so as to be distributed (distributed-storage) in a peer-to-peer communication system of this kind is known. By the system, fault-tolerance and access dispersibility is increased. The locations of content data distribution-stored can be efficiently retrieved by using, for example, a distributed hash table (hereinbelow, DHT) disclosed in Patent Document 1. The DHT is stored in each of node devices. In the DHT, node information (including, for example, the IP address and the port number) indicative of a plurality of node devices to which various messages are to be transferred is registered.

When it is demanded to obtain desired content data, a node device participating in a content distributed-storage system transmits a message (query) for retrieving (finding) the location of the content data to another node device. The message is transferred toward a node device that manages the location of the content data via a plurality of relay node devices in accordance with the DHT. The node device obtains node information from the managing node device to which the message is finally transferred. With the node information, the node device which has transmitted the message can request for the content data to a node device that stores the content data related to the retrieval and receive the content data provided.

Patent Document 1: Japanese Patent Application Laid-Open (JP-A) No. 2006-197400

SUMMARY OF THE INVENTION

There may be a case in future that content data in a single unit is divided into a plurality of data, and the divided content data is distribution-stored in a plurality of node devices. However, in the case of performing special playback such as fast-forward playback, reverse playback, and seek playback on the divided content data, the divided content data including frame image data to be sequentially reproduced may be distribution-stored in a plurality of node devices. There is consequently the possibility that it becomes difficult to realize smooth special playback.

The present invention has been achieved in view of the above points. An object of the present invention is to provide a content distributed-storage system, a frame image obtaining method, a node device, and the like capable of smoothly executing special playback even in the case where content data in a single unit is divided into a plurality of pieces and the divided content data is distribution-stored in a plurality of node devices.

In order to solve the above problem, the invention according to claim 1 relates to a node device included in a content distributed-storage system in which divided content data obtained by dividing content data of a single unit having a plurality of pieces of frame image data into a plurality of pieces is stored so as to be distributed to a plurality of node devices, unique identification information is assigned to each of the divided content data, and each of the node devices can obtain the divided content data on the basis of the identification information, the node device comprising:

storing means for storing content catalog information having the identification information of at least one piece of the divided content data and key frame information including information indicative of an offset position of the frame image data in each of the divided content data;

instruction receiving means for receiving an instruction related to playback of the content data from the user;

specifying means for specifying the key frame information corresponding to the frame image data to be reproduced in accordance with the instruction and the identification information of divided content data including the frame image data to be reproduced on the basis of the content catalog information; and frame obtaining means for obtaining the frame image data corresponding to the key frame information and the identification information specified.

BRIEF DESCRIPTION OF DRAWINGS

FIG. 2 is a diagram showing an example of a routing table using a DHT held by a node N2.

FIG. 9 is a diagram showing a state where fast-forward playback is performed using the content catalog information (structure example 1) illustrated in FIG. 6.

FIG. 10 is a diagram showing a state where fast-forward playback is performed using the content catalog information (structure example 2) illustrated in FIG. 7.

FIG. 11 is a diagram showing a state where fast-forward playback is performed using the content catalog information (structure example 3) illustrated in FIG. 8.

FIG. 13 is a diagram showing an example of a data structure in the content catalog information and the header of the divided content data (structure example 1) in the case of the example of FIG. 12A.

FIG. 14 is a diagram showing an example of a data structure in the content catalog information and the header of the divided content data (structure example 2) in the case of the example of FIG. 12B.

FIG. 15 is a diagram showing an example of a data structure in the content catalog information and the header of the divided content data (structure example 3) in the case of the example of FIG. 12C.

FIG. 20 is a diagram showing an example of a data structure in the content catalog information and the key frame information file (structure example 1) in the case of the example of FIG. 19A.

FIG. 21 is a diagram showing an example of a data structure in the content catalog information and the key frame information file (structure example 2) in the case of the example of FIG. 19B.

FIG. 22 is a diagram showing an example of a data structure in the content catalog information and the key frame information file (structure example 3) in the case of the example of FIG. 19C.

DETAILED DESCRIPTION OF THE PREFERRED EMBODIMENTS

Figure 1:
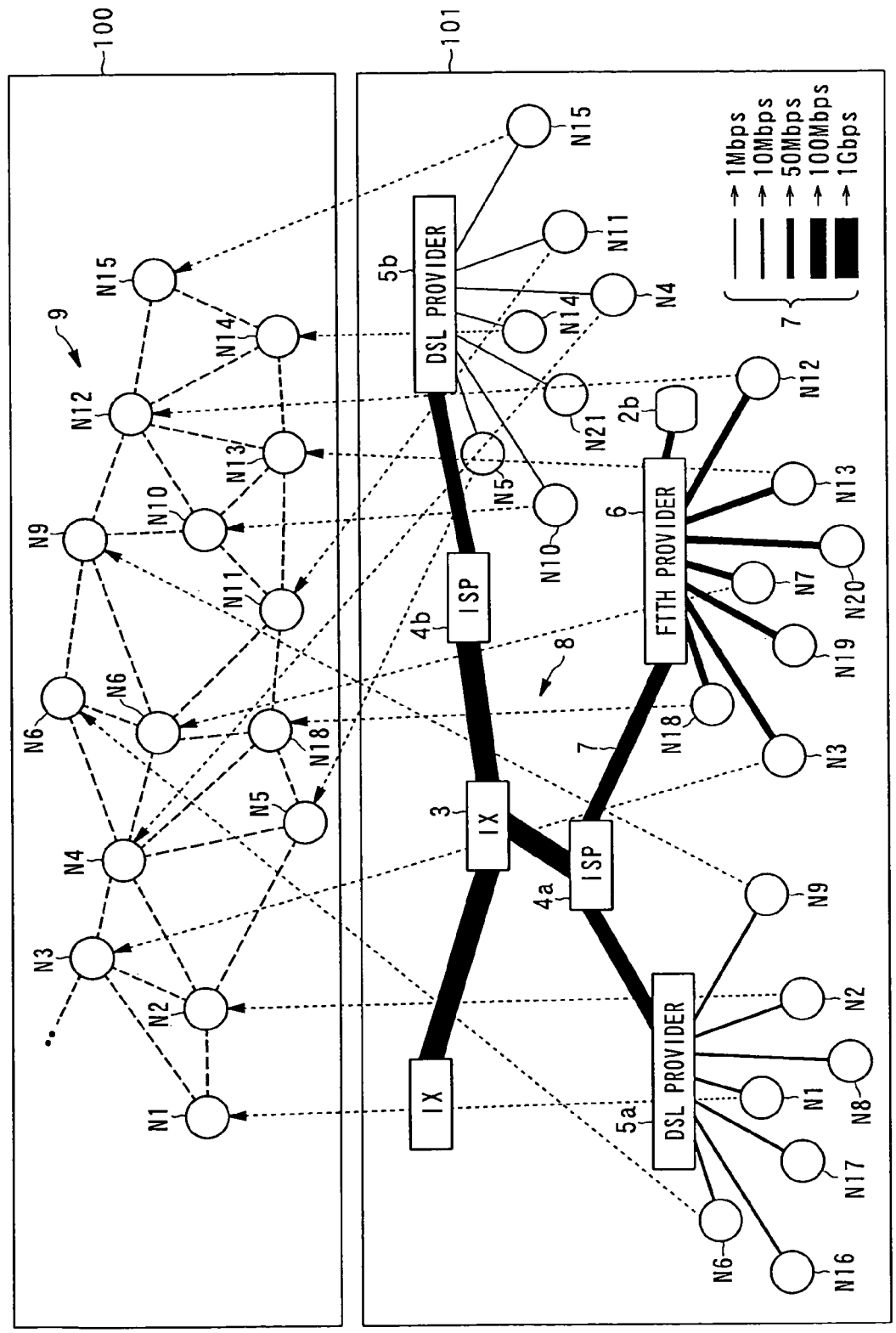
FIG. 1 is a diagram showing an example of a connection mode of node devices in a content distributed-storage system as an embodiment of the present invention.

Each designation of numerical references in the drawings is typically as follows:
8 network
9 overlay network
10 broadcast station apparatus
11 control unit
12 storing unit
13 buffer memory
14 decoder
15 video processing unit
16 display unit
17 voice processing unit
18 speaker
20 communication unit
21 input unit
22 bus
Nn node
S content distributed-storage system Best modes for carrying out the present invention will be described below with reference to the drawings.

1. Configuration and the Like of Content Distributed-Storage System

First, a schematic configuration and the like of a content distributed-storage system as an embodiment of the present invention will be described with reference to FIG. 1 and the like.

FIG. 1 is a diagram showing an example of a connection mode of node devices in a content distributed-storage system as an embodiment of the present invention.

As shown in a lower frame 101 in FIG. 1, a network (a communication network in the real world) 8 such as the Internet is constructed by IXs (Internet exchanges) 3, ISPs (Internet Service Providers) 4a and 4b, (apparatuses of) DSL (Digital Subscriber Line) providers 5a and 5b, (an apparatus of) an FTTH (Fiber To The Home) provider 6, communication lines (for example, telephone lines, optical cables, and the like) 7, and so on. Although routers for transferring data (packets) are properly inserted in the network (communication network) 8 in the example of FIG. 1, they are not shown.

To the network 8, a plurality of node devices (hereinbelow, called "nodes") Nn (n=1, 2, 3, . . . ) are connected. To each of nodes Nn, a unique serial number and IP (Internet Protocol) address are assigned. The same serial number and the same IP address are not assigned to a plurality of nodes.

The content distributed-storage system S of the embodiment is a peer-to-peer network system formed by a plurality of nodes Nn out of the nodes Nn as shown in an upper frame 100 in FIG. 1. A network 9 shown in the upper frame 100 in FIG. 1 is an overlay network 9 (logical network) in which a virtual link formed by using the existing network 8 is constructed.

Such a content distributed-storage system S is realized by a specific algorithm such as an algorithm using a DHT (Distributed Hash Table). To each of nodes Nn participating in the content distributed-storage system S, a node ID as unique node identification information is assigned. The node ID is a value (for example, having a bit length of 160 bits) obtained by hashing the IP address or serial number assigned to the node Nn with a common hash function (for example, SHA-1). The node IDs are disposed so as to be uniformly dispersed in a single ID space.

A not-participating node Nn (for example, node N8) participates in the content distributed-storage system S by sending a participation message indicative of a participation request to an arbitrary participating node Nn (for example, a contact node which is always participating in the system S).

When IP addresses or serial numbers are different from each other, the probability that node IDs obtained (hashed) with the common hash function become the same value is extremely low. The node ID has to be made of the number of bits large enough to accommodate the maximum number of operating nodes. For example, when the number of bits is 128, $2^{128}=340\times10^{36}$ nodes can be operated. Since the hash function is known, the details will not be described.

Each of the nodes Nn has a DHT. The DHT specifies transfer destinations of various messages on the content distributed-storage system S. Concretely, in the DHT, a plurality of pieces of node information (transfer destination node information) including the node IDs, IP addresses, and port numbers of nodes Nn having some distances in the ID space are registered.

One of the nodes Nn participating in the content distributed-storage system S registers node information of the minimum nodes Nn out of all of the nodes Nn participating in the system S in its routing table and obtains unknown (not-stored) node information of a node Nn by exchanging various messages among the nodes Nn.

1.1 Routing Table Using DHT

A routing table using a DHT will be described in detail with reference to FIGS. 2 and 3.

FIG. 2 is a diagram showing an example of a routing table using a DHT held in the node N2. FIG. 3 is a conceptual diagram showing an example of the ID space of the DHT.

Figure 3:
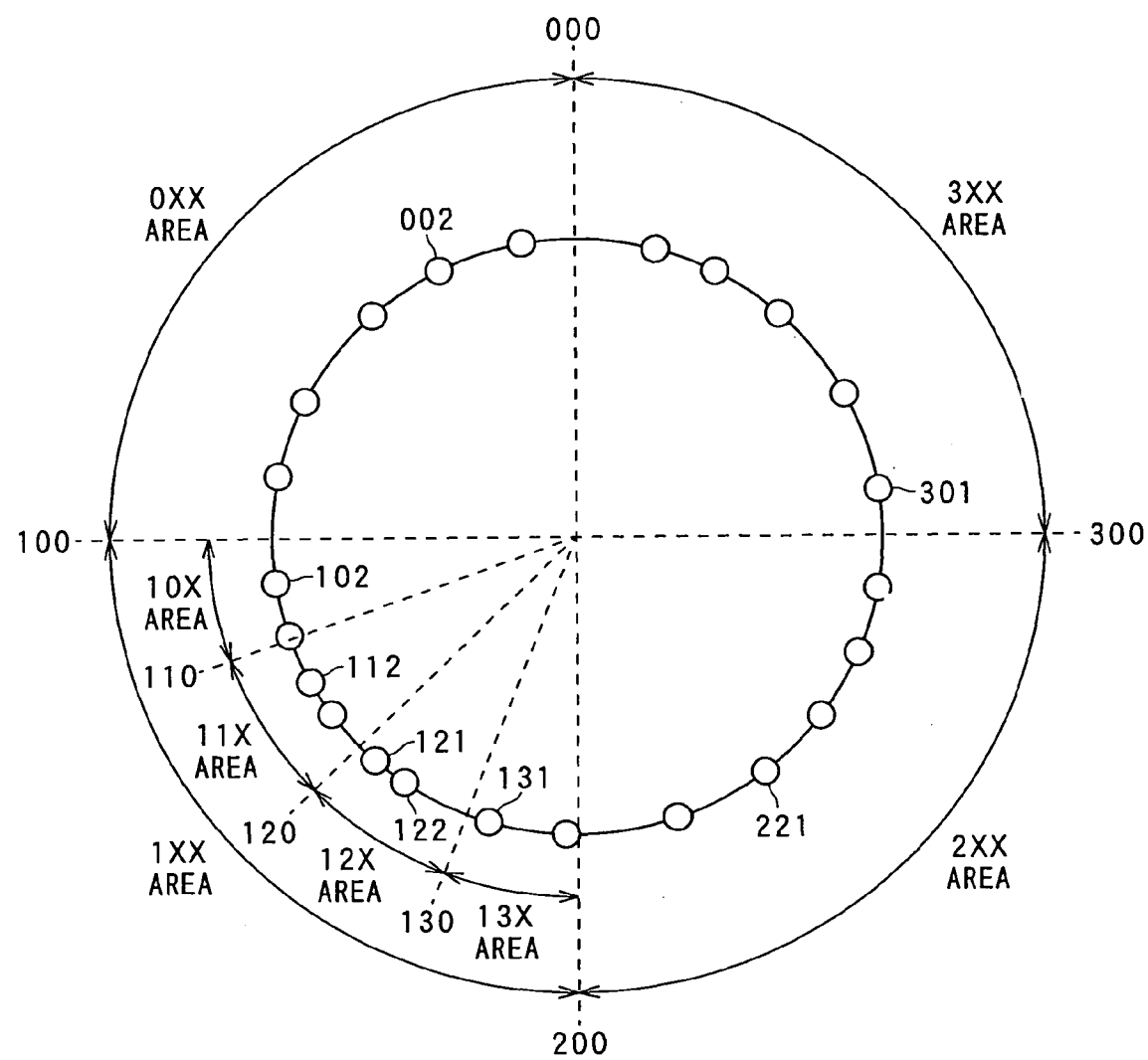
FIG. 3 is a conceptual diagram showing an example of an ID space of the DHT.

In the example of FIGS. 2 and 3, for convenience of explanation, the length of bits of a node ID is set to 6 bits (=2 bits×3 digits). Each of the digits is expressed in quaternary number (integer of 0 to 3) (in practice, the longer bit length is used, and each of the digits is divided, for example, every four bits and expressed in hexadecimal of 0 to f).

In the example of FIG. 2, the routing table using the DHT is a table of levels 1 to 3 (sectioned in a plurality of levels). In a table entry at each of the levels, as node information, a node ID and an IP address and a port number of a corresponding node Nn are registered so as to be associated with each other area by area. Each of the areas in the tables at the levels is obtained by dividing the node ID space of the DHT. For example, as shown in FIG. 3, at level 1, the entire ID space of the DHT is divided into four areas; an area 0XX where node IDs "000" to "033" exist, an area 1XX where node IDs "100" to "133" exist, an area 2XX where node IDs "200" to "233" exist, and an area 3XX where node IDs "300" to "333" exist. At level 2, each of the areas at level 1 (that is, the areas 0XX to 3XX) is further divided into four areas. For example, the area 1XX is divided into four areas; an area 10X where node IDs "100" to "103" exist, an area 11X where the node IDs "110" to "113" exist, an area 12X where the node IDs "120" to "123" exist, and an area 13X where the node IDs "130" to "133" exist.

For example, when the node ID of the node N2 is "122", as shown in FIG. 2, the node ID and the IP address of the node itself (since the IP address is the IP address of the node itself, it does not have to be registered in the routing table) and the like are registered in the table of the area 1XX (the area where the node ID itself exists) at level 1 of the node N2. In areas where the node N2 does not exist (that is, the areas 0XX, 2XX, and 3XX), the node IDs, IP address, and the like of other arbitrary nodes Nn are registered.

In the table of the area 12X (where the node N1 exists) at level 2 of the node N1, as shown in FIG. 2, the node ID and the IP address of the node itself (since the IP address is the IP address of the node itself, it does not have to be registered in the routing table) and the like are registered. In areas where the node N1 does not exist (that is, the areas 10X, 11X, and 13X), the node IDs, IP address, and the like of other arbitrary nodes Nn are registered.

Further, at level 3 of the node N2, as shown in FIG. 2, the node IDs of the node IDs "120" to "122" and the IP addresses (since the IP addresses are those of the nodes themselves, they do not have to be registered in the routing table) and the like are registered.

In the example of FIGS. 2 and 3, the bit length of a node ID is set to "3 digits×2 bits", so that the table of three levels 1 to 3 is sufficient. However, when the bit length of a node ID is longer, a table of levels according to the bit length is necessary (for example, in the case of setting the bit length of the node ID to "16 digits×4 bits", a table of 16 levels is necessary).

As described above, in the routing table using the DHT in the embodiment, the higher the level is, the narrower the area becomes.

Such a DHT is given, for example, when a not-participating node participates in the content distributed-storage system S.

1.2 Method of Storing and Finding Content Data

Next, a method of storing and finding content data which can be obtained in the content distributed-storage system S will be described.

In the content distributed-storage system S, various content (such as movies and music) data is stored so as to be distributed in a plurality of nodes Nn (in other words, content data is copied and a replica as the copied information is stored so as to be distributed).

In the embodiment, content data of a single unit (for example, content data of a large data size (data capacity) such as a movie, a television program, and the like) having a plurality of pieces of frame image data (video data) is divided in a plurality of pieces (for example, a few Mbytes). The divided content data (in the same data size or different data sizes) is stored so as to be spread to the plurality of nodes Nn (hereinbelow, also called "content holding nodes").

For example, when content data A of a movie whose title is XXX is divided into four divided content data A1 to A4, the divided content data A1 is stored in nodes N1 and N5, the divided content data A2 is stored in a node N3, the divided content data A3 is stored in a node N7, and the divided content data A4 is stored in nodes N8 and N10. Content data of another movie of a different title is also similarly divided and stored in a plurality of nodes Nn.

To each of the divided content data A1 to A4, a content ID (CID) (identification information unique to each divided content data) is assigned. The content ID is generated by, for example, hashing "content name (which varies among content data)+an arbitrary value (or a few bytes from the head of the divided content data)" with a common hash function which is also used at the time of obtaining the node ID (the content ID is disposed in the same ID space as the node ID).

The arbitrary value is a value which varies among the divided content data A1 to A4 and has regularity in such a manner that the value is "1" for A1, "2" for A2, "3" for A3, and "4" for A4, for example. Alternatively, the system administrator may give an unconditional ID value (having the same bit length as that of the node ID) to each content.

Index information including a set of the location of, for example, the divided content data A1 which is distribution-stored, that is, the node information (including, for example, the IP address and the port number) of the node Nn that stores the divided content data A1 and the content ID corresponding to the divided content data A1 is stored (in an index cache) and managed by a node Nn as a node managing the location of the divided content data A1 (hereinbelow, called "root node" or "root node of content (content ID)") (the divided content data A2 to A4 is similarly treated).

For example, index information of the divided content data A1 is managed by the node N4 as the root node of the content (content ID), and the index information of the divided content data A2 is managed by the node N6 as the root node of the content (content ID).

Specifically, even in the case where load distribution is achieved since a root node is provided for each divided content data and, moreover, the same divided content data A1 (having the same content ID) is held in a plurality of content holding nodes, the index information of the divided content data A1 can be managed by a single root node. Such a root node is determined as, for example, a node Nn having a node ID closest to the content ID (for example, having the largest number of upper digits matched with those of the content ID).

In the case where the user of a node Nn wishes to obtain desired content data, the node Nn desiring acquisition of the content data (hereinbelow, called "user node") generates a message (query) for inquiring (retrieving) the location of content including the content ID of, for example, divided content data A1 as a component of content data A selected by the user (for example, selected from content catalog information (also called a content list) distributed to all of the nodes Nn and the node information of the node Nn itself. The user node transmits the message to another node Nn in accordance with a routing table using the DHT of the user node Nn itself. That is, the user node transmits the content location inquiry (retrieval) message toward the root node. The content location inquiry (retrieval) message finally reaches the root node by DHT routing using the content ID as a key.

The content ID included in the content location inquiry (retrieval) message may be generated by hashing the content name with the common hash function by the user node.

The content catalog information is managed (updated or the like) by the node Nn that manages the content catalog information or a server, and is distributed to the nodes Nn participating in the content distributed-storage system S from the node Nn or the server.

Figure 4:
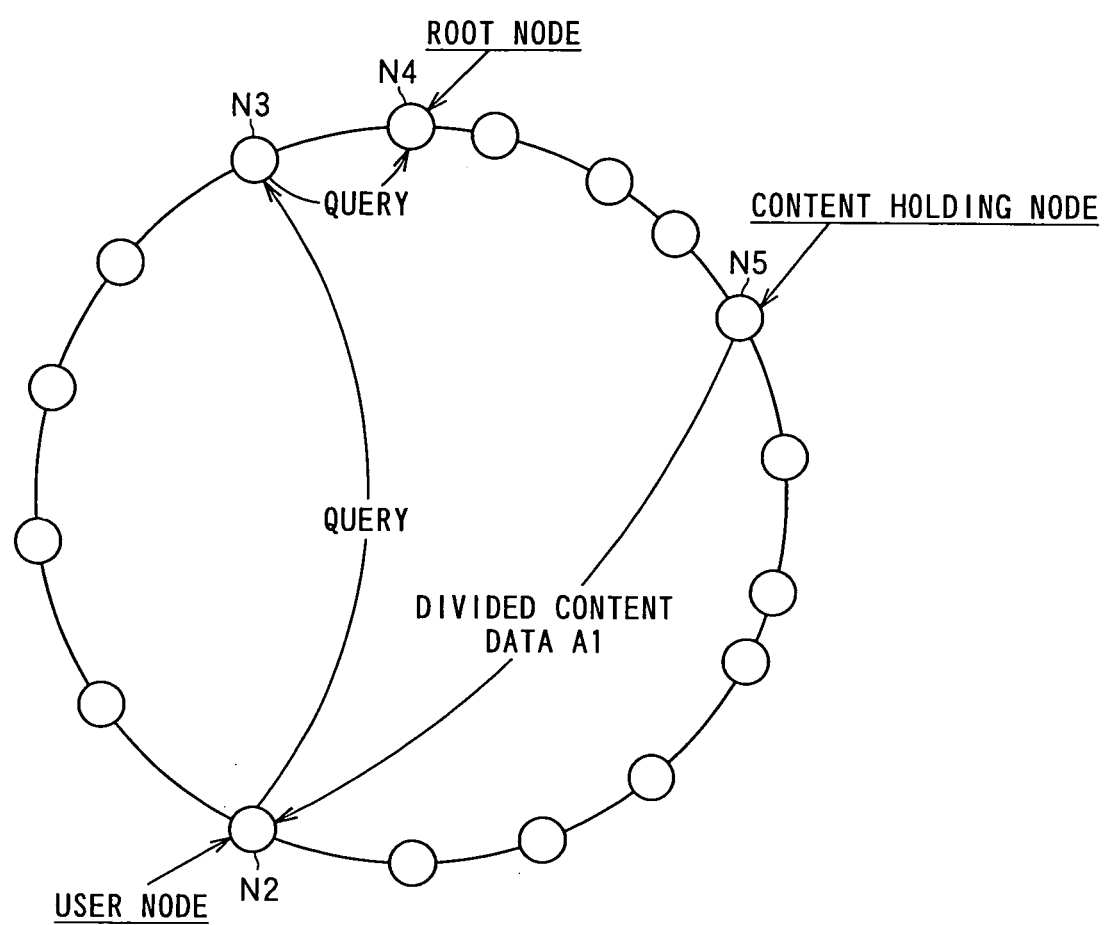
FIG. 4 is a conceptual diagram showing an example of the flow of a content location inquiry (search) message transmitted from a user node in the ID space of the DHT.

FIG. 4 is a conceptual diagram showing an example of the flow of the content location inquiry (retrieval) message transmitted from the user node, in the ID space of the DHT.

In the example of FIG. 4, for example, a node N2 as the user node refers to the table at the level 1 of the DHT of itself (which is not related to the routing table using the DHT shown in FIG. 2), obtains the IP address and the port number included in node information of, for example, a node N3 having a node ID closest to the content ID included in the content location inquiry (retrieval) message (for example, node ID having the largest number of upper digits matched with those of the content ID), and transmits the content location inquiry (retrieval) message to the IP address and the port number.

The node N3 receives the content location inquiry (retrieval) message, refers to the table at level 2 of the DHT of itself, obtains the IP address and the port number included in node information of, for example, a node N4 having a node ID closest to the content ID included in the content location inquiry (retrieval) message (for example, node ID having the largest number of upper digits matched with those of the content ID), and transmits the content location inquiry (retrieval) message to the IP address and the port number.

When the node N4 receives the content location inquiry (retrieval) message, refers to the table at level 3 of the DHT of itself, and recognizes that the node ID closest to the content ID included in the content location inquiry (retrieval) message (for example, node ID having the largest number of upper digits matched with those of the content ID) is the node ID of the node N4 itself, that is, the node N4 is the root node of the content ID, the node N4 obtains index information corresponding to the content ID included in the content location inquiry (retrieval) message from an index cache, and sends back the index information to the user node as the transmitter of the content location inquiry message. According to the index information, the user node transmits a content transmission request message to, for example, a node N5 as the content holding node which stores the divided content data A1 as a part of the desired content data A, and receives supply of the divided content data A1 (that is, the user node can obtain the divided content data A1 on the basis of the content ID). For example, the content holding node streaming-distributes packet data of the divided content data A1 in response to a request from the user node, and the user node receives and reproduces (normally reproduces) the packet data of the divided content data A1 distributed.

Alternatively, the node N4 as the root node transmits a content transmission request message (request information including node information of a user node and indicative of a request for transmitting the divided content data A1 to the user node) to the content holding node shown in the node information included in the index information. Consequently, the user node receives supply of the divided content data A1 from, for example, a node N5 as the content holding node. The user node can obtain (receive) the index information from a relay node (for example, the cache node of the node N3) that caches the same index information as that in the root node by the time the content location inquiry message reaches the root node.

At a predetermined timing near the end of distribution of the divided content data A1, the user node generates a content location inquiry (retrieval) message (query) including the content ID of divided content data A2 following the divided content data A1 and the node information of the user node itself, and transmits the message to another node Nn in accordance with the routing table using the DHT of the user node itself. As a result, the user node receives supply of the divided content data A2 from the content holding node like the divided content data A1 (also the divided content data A3 and A4).

1.3 Content Data Special Playback (Trick Play) Method

Next, a special playback (trick play) method on content data which can be obtained by the content distributed-storage system S will be described by first to third embodiments.

First Embodiment

In a first embodiment, to smoothly perform special playback (trick play) such as fast-forward playback, reverse playback, or seek (jump) playback on content data divided in a plurality of pieces and stored in different nodes Nn, the content ID of at least one piece of the divided content data, and key frame information indicative of an offset position (for example, position from the head) of each of key frames in each of the divided content data and data size is written in the content catalog information so that the node Nn can promptly specify which a divided content data includes frame image data to be reproduced (hereinbelow, called "key frame").

In an image compressing method such as MPEG, for example, frame information every 1/30 second is compressed. Frame image every one second is compressed using only one piece of frame information and is called "a key frame" (compression is completed within a frame). With respect to the other frames every 1/30 second, only differential information between the key frame and frames before and after the key frame is compressed, and the compressed information is recorded. For example, if the frames every one second are displayed at 1/10-second intervals, the special playback is 10X fast-forward playback. In the case of the compression method as described above, the key frame has to be used. If the frame of the differential information is supplied to a decoder, the decoder cannot decompress the information only by the frame. In order to perform the fast-forward playback and the reverse playback, it is important to accurately know the position and size of the key frame in compressed data. In the case of seek reproduction as well, to display a frame promptly after start of playback, it is preferable to supply data from the key frame to the decoder. Consequently, it is important to know the position of the key frame.

The content catalog information is managed (updated or the like) by a node Nn managing the content catalog information or a server and distributed from the node Nn or the server to each of the nodes Nn participating in the content distributed-storage system S.

Figure 5A:
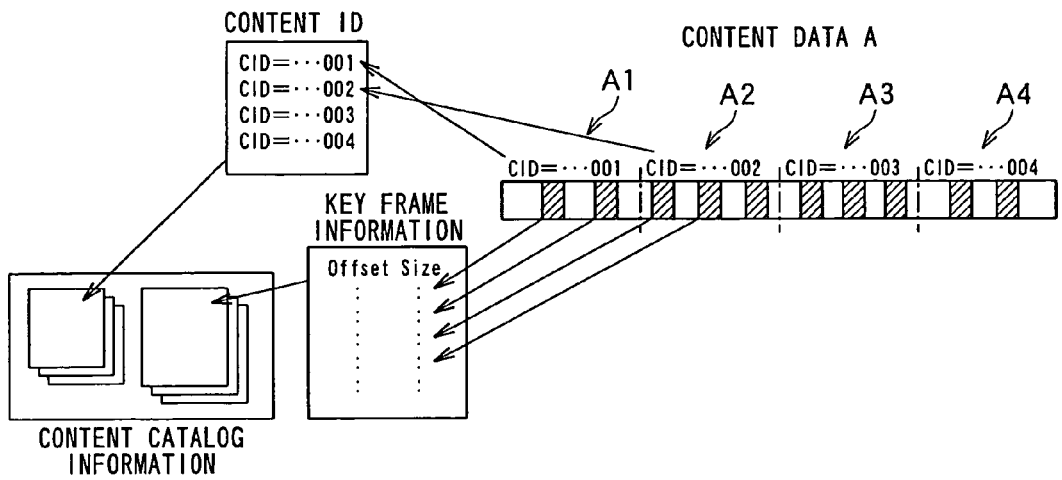
FIGS. 5A, 5B, and 5C are conceptual diagrams showing a state where content data is divided and key frame information of key frames in the divided content data is written in content catalog information.
Figure 5B:
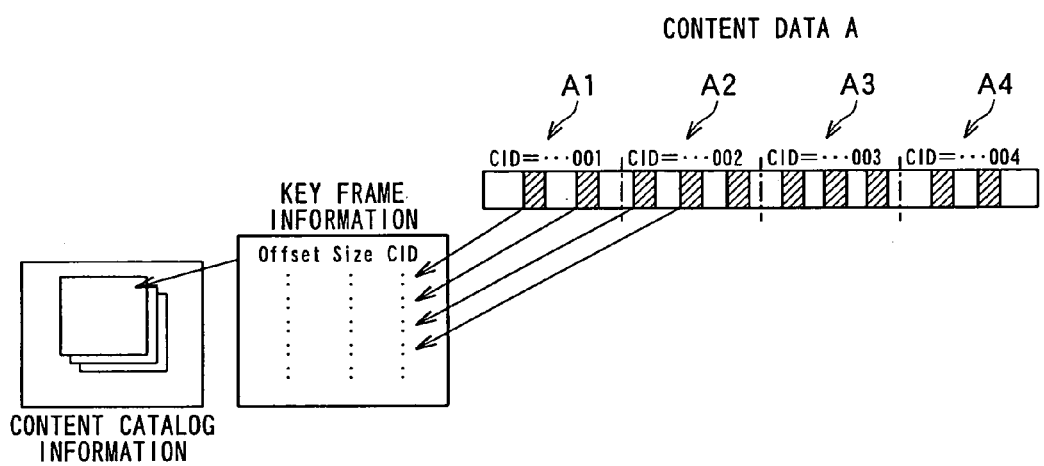
Figure 5C:
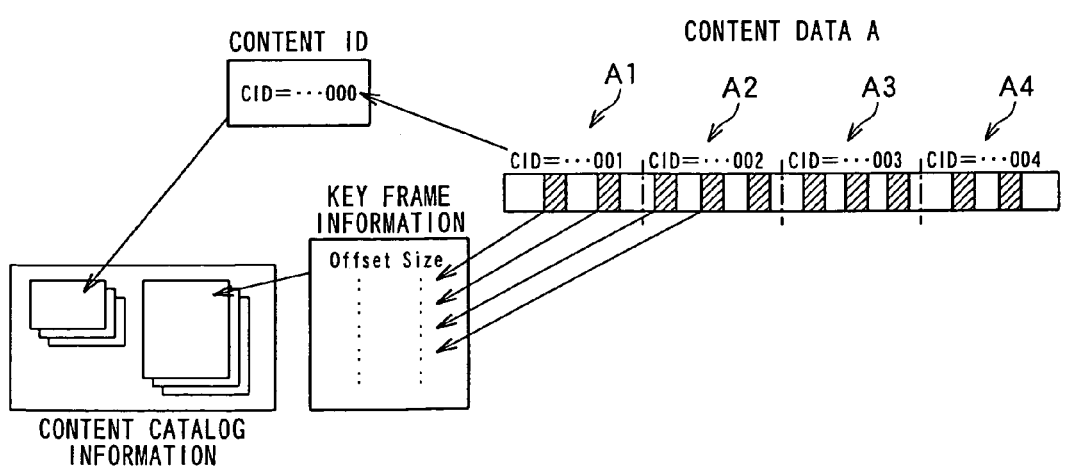

FIGS. 5A to 5C are conceptual diagrams showing a state where content data is divided and key frame information of a key frame in each of the divided content data is written in the content catalog information.

Figure 6:
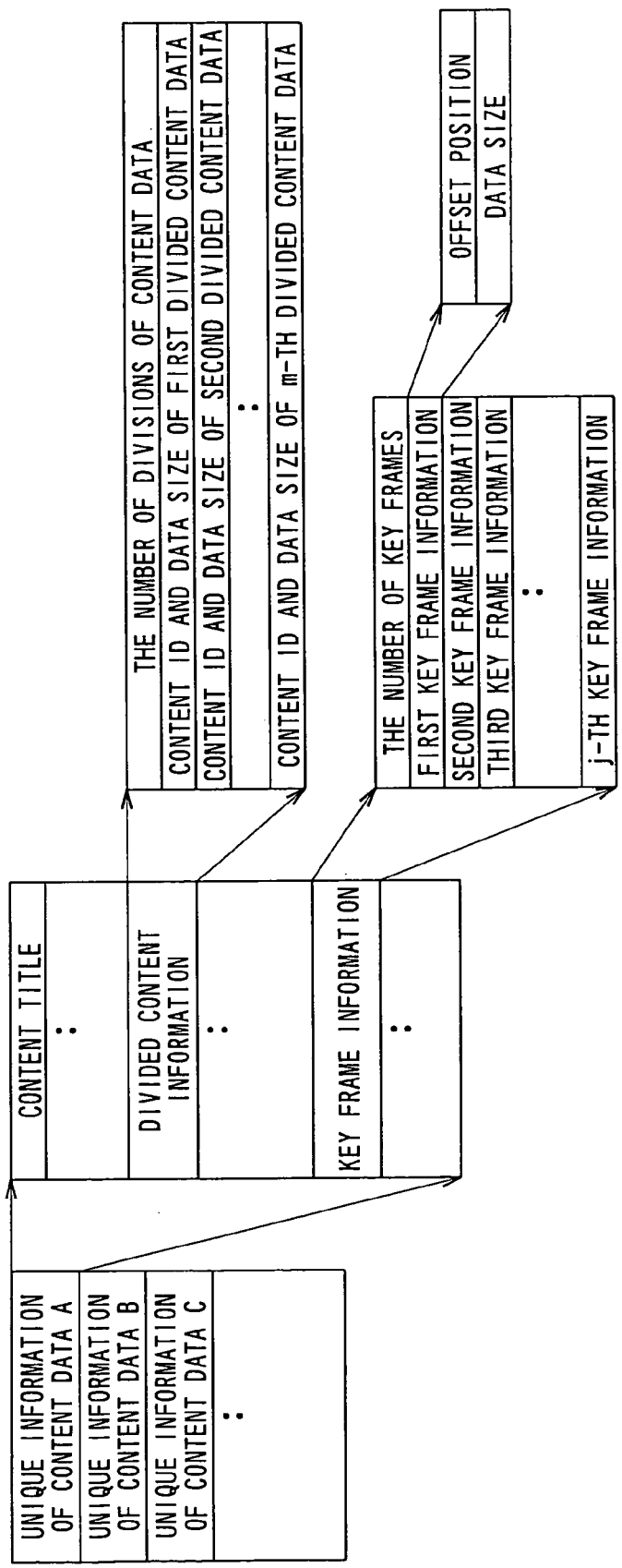
FIG. 6 is a diagram showing an example of a data structure in content catalog information (structure example 1) in the case of the example of FIG. 5A.

In the example of FIG. 5A, the content ID of each of the divided content data and the key frame information (offset position ("Offset") and data size ("Size")) corresponding to each of the key frames in the divided content data are separately written in the content catalog information. FIG. 6 shows an example of the data structure of the content catalog information (structure example 1) in the case of the example of FIG. 5A.

The content catalog information (structure example 1) shown in FIG. 6 has unique information of each of content data (A, B, C, . . . ) which can be obtained by each of the nodes Nn in the content distributed-storage system S. The peculiar information of each of the content data (A, B, C, . . . ) includes a content title (content name), divided content information, and key frame information. The divided content information includes the division number of content data and the content ID and the data size of each of the first (head) to the m-th (m: natural number) divided content data. The key frame information includes the number of key frames (the number of key frames in the content data) and the first (head) to the j-th (j: natural number) key frame information. Each of the key frame information includes the offset position of the key frame (the offset position from the head of the content data) and the data size of the key frame. With the content catalog information (structure example 1), the node Nn can determine divided content data including a key frame by calculation. With the content catalog information (structure example 1), the correspondence relation between the offset position and the data size of a key frame and the content ID of divided content data including the key frame can be obtained by calculation without being specified in the content catalog information.

Figure 7:
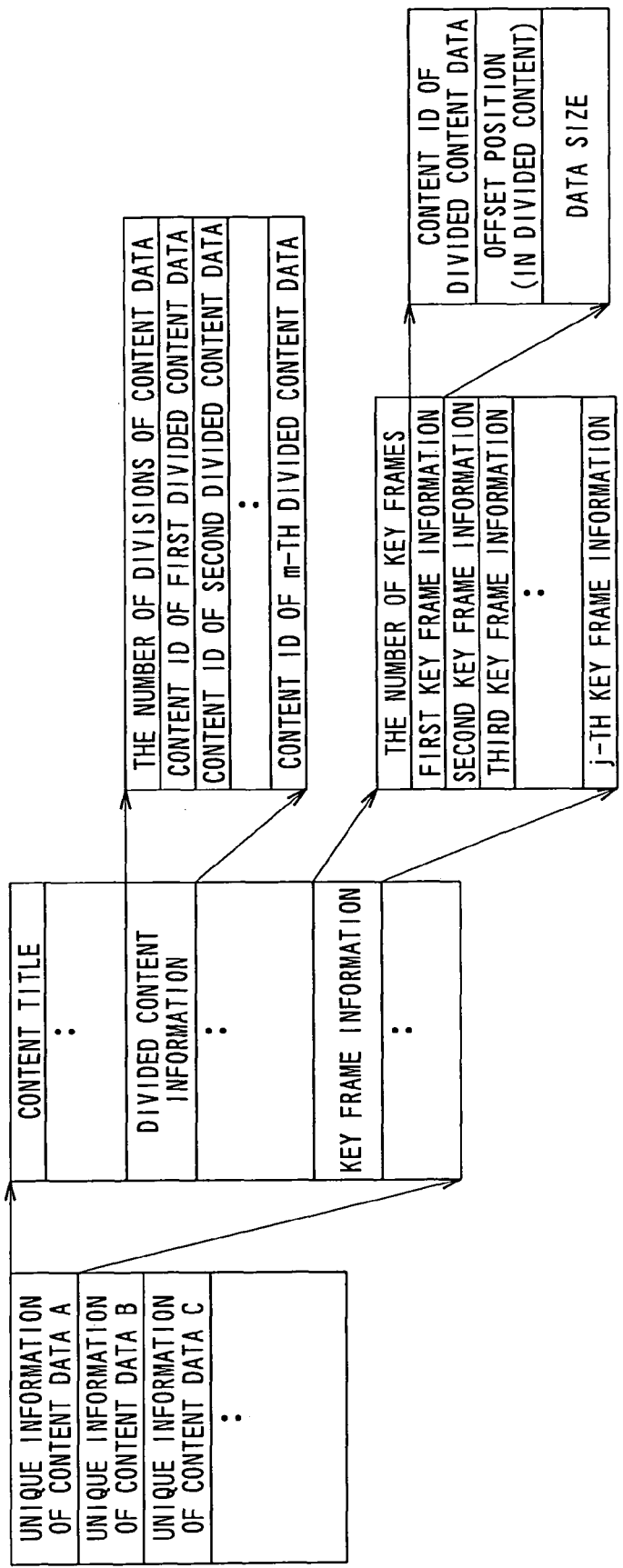
FIG. 7 is a diagram showing an example of a data structure in content catalog information (structure example 2) in the case of the example of FIG. 5B.

In the example of FIG. 5B, the content ID of each of the divided content data is included in the key frame information (offset position ("Offset") and data size ("Size")) corresponding to each of the key frames in the divided content data, and is written in the content catalog information so as to be associated with the offset position and the like. FIG. 7 shows an example of the data structure of the content catalog information (structure example 2) in the case of the example of FIG. 5B.

The basic structure of the content catalog information (structure example 2) shown in FIG. 7 is similar to that of the content catalog information (structure example 1) shown in FIG. 6 except that divided content information includes the division number of content data and the content ID of each of the first (head) to the m-th (m: natural number) divided content data (the data size is not included). Each of the key frame information includes the content ID of divided content data including a key frame so as to be associated with the offset position of the key frame (the offset position from the head of divided the content data) and the data size of the key frame. With the content catalog information (structure example 2), divided content data including a key frame can be specified more promptly without determination by calculation executed by the node Nn.

Figure 8:
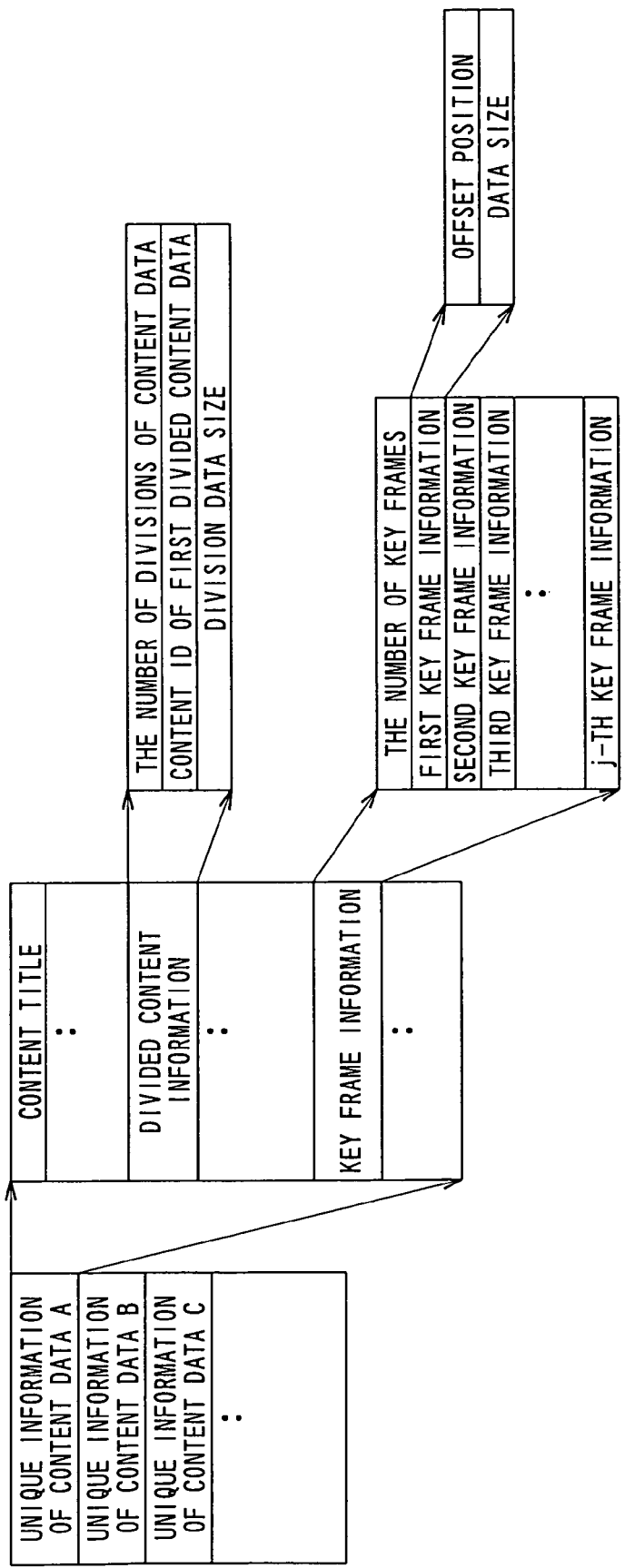
FIG. 8 is a diagram showing an example of a data structure in content catalog information (structure example 3) in the case of the example of FIG. 5C.

In the example of FIG. 5C, only the content ID of the first (head) divided content data and the key frame information (offset position ("Offset") and data size ("Size")) corresponding to each of the key frames in the divided content data are written in the content catalog information. FIG. 8 shows an example of the data structure of the content catalog information (structure example 3) in the case of the example of FIG. 5C.

The basic structure of the content catalog information (structure example 3) shown in FIG. 8 is similar to that of the content catalog information (structure example 1) shown in FIG. 6 except that divided content information includes the division number of content data, the content ID of the first (head) divided content data, and the division data size. That is, in the content catalog information (structure example 3), the content IDs of all of the divided content data are not included, but only the content ID of the first (head) divided content data is included. The content IDs of divided content data other than the first (head) divided content data is obtained by calculation from the content ID of the first (head) divided content data. The division data size is information of the data size by which the content data is divided (the data size of the divided content data is the same). With the content catalog information (structure example 3), the content IDs of all of the divided content data do not have to be included. Thus, the data amount can be reduced.

Outline of the fast-forward playback will be described using the content catalog information with reference to FIGS. 9 to 11.

FIG. 9 is a diagram showing a state where fast-forward playback is performed using the content catalog information (structure example 1) illustrated in FIG. 6. FIG. 10 is a diagram showing a state where fast-forward playback is performed using the content catalog information (structure example 2) illustrated in FIG. 7. FIG. 11 is a diagram showing a state where fast-forward playback is performed using the content catalog information (structure example 3) illustrated in FIG. 8.

In any of the examples of FIGS. 9 to 11, the user node specifies key frame information corresponding to a key frame to be reproduced and a content ID of divided content data including the key frame to be reproduced on the basis of content catalog information in response to a content fast-forward playback instruction (an example of the instructions related to playback) from the user. The user node obtains the key frame corresponding to the specified key frame information and the content ID from a content holding node (which stores divided content data corresponding to the content ID specified by the user node, and which is specified by an inquiry sent to a root node by DHT routing using the content ID as a key), and reproduces the key frame (by fast-forward playback).

In the case of using the content catalog information (structure example 1) as shown in FIG. 9, divided content data (content ID) including a key frame to be reproduced is determined by calculation on the basis of the data size of the divided content data and key frame information (the offset position and the data size) of the key frame to be reproduced. On the other hand, in the case of using the content catalog information (structure example 2) as shown in FIG. 10, divided content data (content ID) including a key frame to be reproduced is specified from the key frame information. As shown in FIG. 11, in the case of using content catalog information (structure example 3), a content ID other than that of the first (head) divided content data is obtained by calculation from the content ID of the first (head) divided content data.

Second Embodiment

In a second embodiment, to smoothly perform special playback (trick play) such as fast-forward playback, reverse playback, or seek (jump) playback on content data divided in a plurality of pieces and stored in different nodes Nn, so that the node Nn can promptly specify which divided content data includes frame image data to be reproduce, key frame information indicative of an offset position (for example, position from the head) of each of key frames in each of the divided content data and data size is included (written) in at least one of the divided content data (for example, in the header of the divided content data). By including the key frame information in the header of divided content data, the node Nn can easily obtain the key frame information promptly.

Figure 12A:
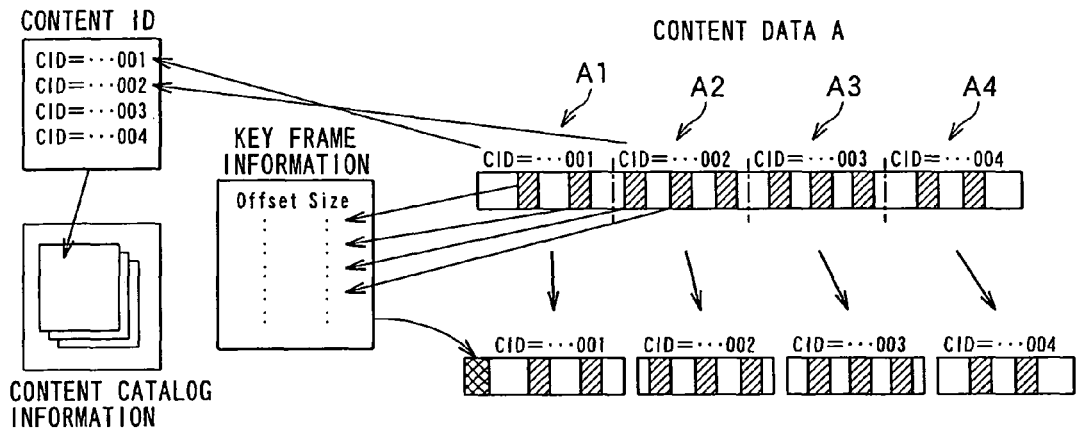
FIGS. 12A, 12B, and 12C are conceptual diagrams showing a state where content data is divided and key frame information of key frames in the divided content data is written in content catalog information.
Figure 12B:
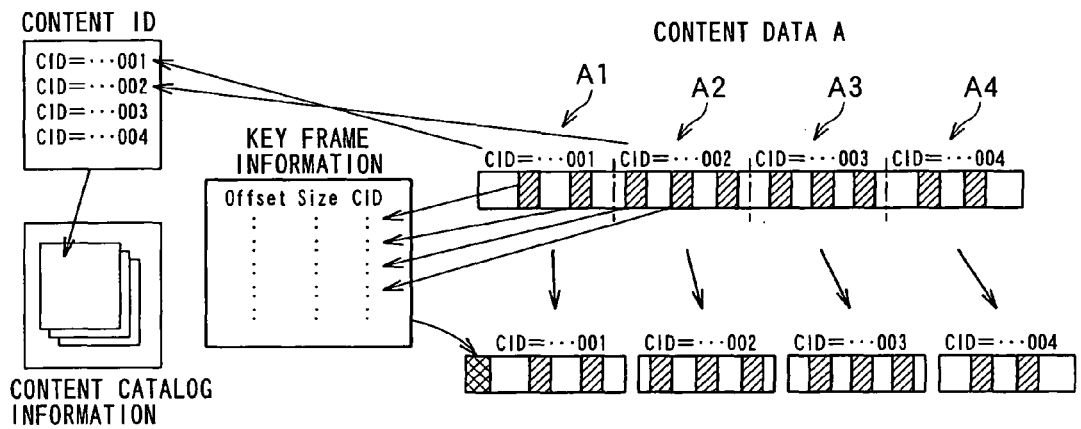
Figure 12C:
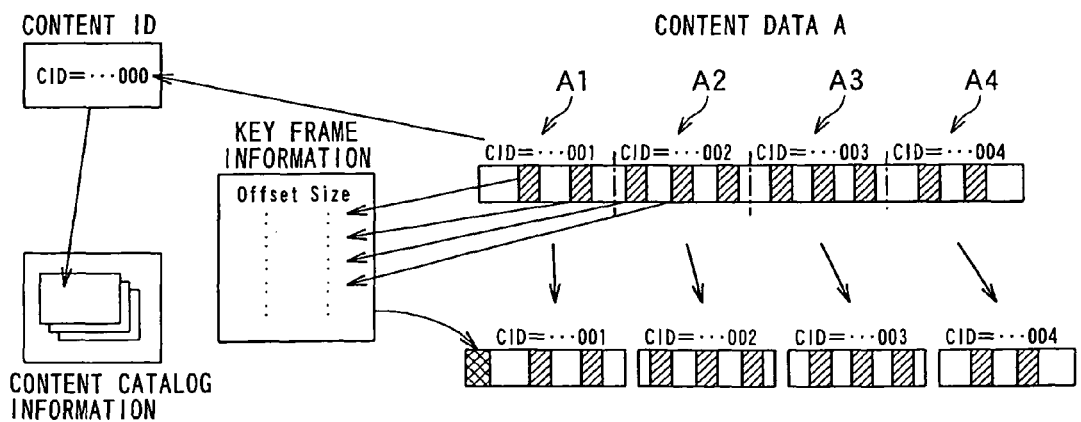

FIGS. 12A to 12C are conceptual diagrams showing a state where content data is divided and key frame information of each of a key frames in each of the divided content data is written in the header of the divided content data at the head.

In the example of FIG. 12A, the key frame information (offset position ("Offset") and data size ("Size")) corresponding to each of the key frames in the divided content data is written in the divided content data at the head. FIG. 13 shows an example of the data structure of the content catalog information and the header of divided content data (structure example 1) in the case of the example of FIG. 12A.

The content catalog information (structure example 1) shown in FIG. 13 has unique information of each of content data (A, B, C, . . . ) which can be obtained by each of the nodes Nn in the content distributed-storage system S. The unique information of each of the content data (A, B, C, . . . ) includes a content title (content name) and divided content information. The divided content information includes the division number of content data and the content ID and the data size of each of the first (head) to the m-th (m: natural number) divided content data.

The header (structure example 1) of the divided content data shown in FIG. 13 includes key frame information. The key frame information includes the number of key frames (the number of key frames in the content data) and the first (head) to the j-th (j: natural number) key frame information. Each of the key frame information includes the offset position of the key frame (the offset position from the head of the content data) and the data size of the key frame. With the header (structure example 1) of the divided content data, the node Nn determines divided content data including a key frame by calculation. With the header (structure example 1) of the divided content data, the correspondence relation between the offset position and the data size of a key frame and the content ID of divided content data including the key frame can be obtained by calculation without being specified in the header of the divided content data.

In the example of FIG. 12B, the content ID of each of the divided content data is included in the key frame information (offset position ("Offset") and data size ("Size")) corresponding to each of the key frames in the divided content data, and is written in the header of the divided content data so as to be associated with the offset position and the like. FIG. 14 shows an example of the data structure of the content catalog information and the header of the divided content data (structure example 2) in the case of the example of FIG. 12B.

The basic structure of the content catalog information (structure example 2) shown in FIG. 14 is similar to that of the content catalog information (structure example 1) shown in FIG. 13 except that divided content information includes the division number of content data and the content ID of each of the first (head) to the m-th (m: natural number) divided content data (the data size is not included).

Each of the key frame information in the header (structure example 2) of the divided content data shown in FIG. 14 includes the content ID of divided content data including a key frame so as to be associated with the offset position of the key frame (the offset position from the head of the content data) and the data size of the key frame. With the header (structure example 2) of the divided content data, divided content data including a key frame can be specified more promptly without determination by calculation executed by the node Nn.

In the example of FIG. 12C, like the example of FIG. 12A, the key frame information (offset position ("Offset") and data size ("Size")) corresponding to each of the key frames in the divided content data is written in the header of the divided content data at the head. FIG. 15 shows an example of the data structure of the content catalog information and the header (structure example 3) of the divided content data in the case of the example of FIG. 12C.

The basic structure of the content catalog information (structure example 3) shown in FIG. 15 is similar to that of the content catalog information (structure example 1) shown in FIG. 13 except that divided content information includes the division number of content data, the content ID of the first (head) divided content data, and the division data size. That is, in the content catalog information (structure example 3), the content IDs of all of the divided content data are not included, but only the content ID of the first (head) divided content data is included. The content IDs of divided content data other than the first (head) divided content data is obtained by calculation from the content ID of the first (head) divided content data. The division data size is information of the data size by which the content data is divided (the data size of the divided content data is the same). Consequently, since the content IDs of all of the divided content data do not have to be included, the data amount can be reduced.

The details of each of key frame information in the header (structure example 3) of divided content data shown in FIG.

15 are similar to those of each of the key frame information in the header (structure example 1) of divided content data shown in FIG. 13.

In the examples of FIGS. 12A to 12C, the key frame information and the like is included only in the header of the divided content data at the head. As another example, the key frame information or the like may be included in the headers of all of the divided content data. With such a configuration, for example, when playback of content data is interrupted and divided content data other than the head data is stored in the node Nn, the key frame information can be obtained without requiring the divided content data at the head. Thus, special playback can be executed more smoothly.

Outline of the fast-forward playback will be described using the content catalog information with reference to FIGS. 16 to 18.

Figure 16:
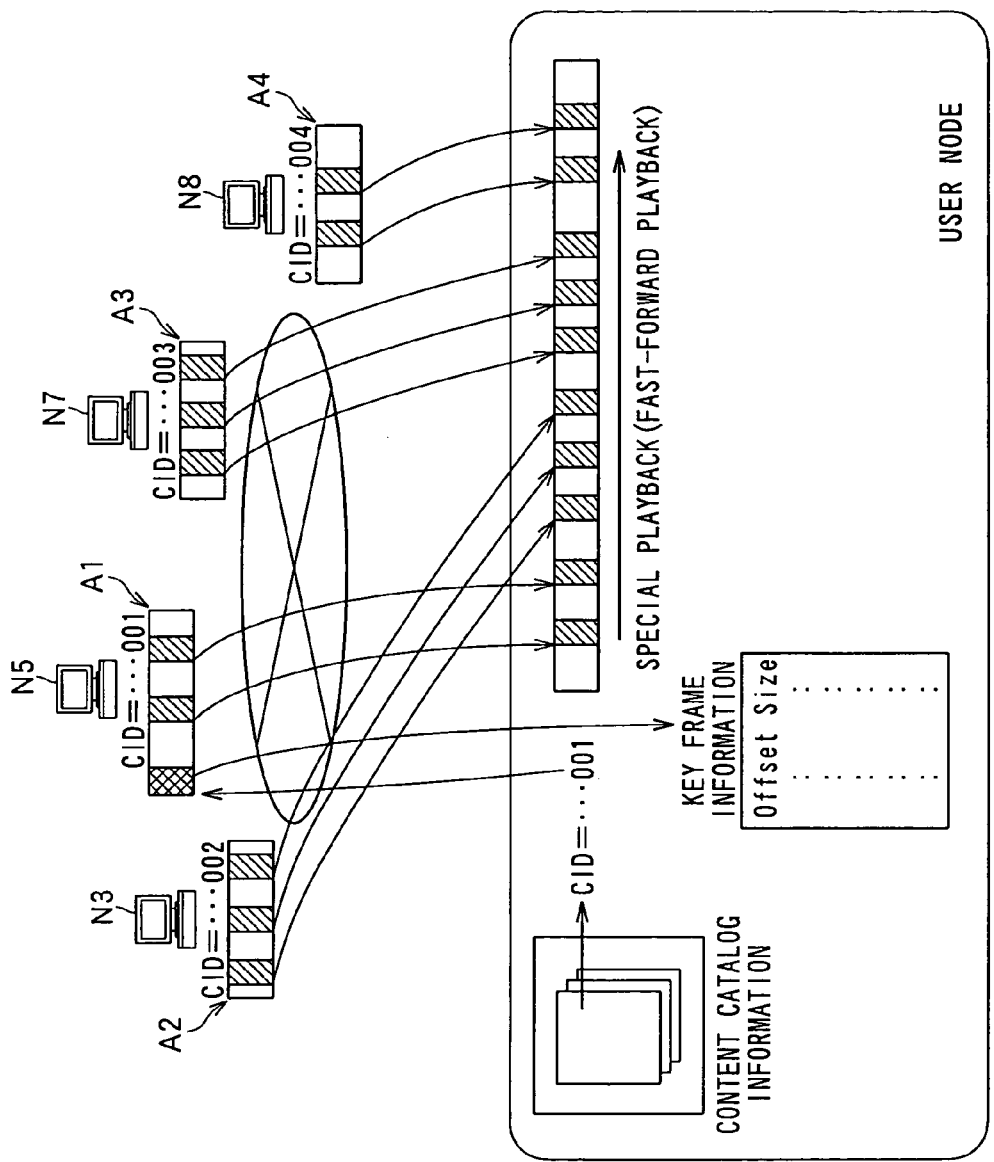
FIG. 16 is a diagram showing a state where fast-forward playback is performed using the content catalog information and the header of the divided content data (structure example 1) illustrated in FIG. 13.

FIG. 16 is a diagram showing a state where fast-forward playback is performed using the content catalog information and the header (structure example 1) of divided content data illustrated in FIG. 13. FIG. 17 is a diagram showing a state where fast-forward playback is performed using the content catalog information and the header (structure example 2) of divided content data illustrated in FIG. 14. FIG. 18 is a diagram showing a state where fast-forward playback is performed using the content catalog information and the header (structure example 3) of divided content data illustrated in FIG. 15.

Figure 17:
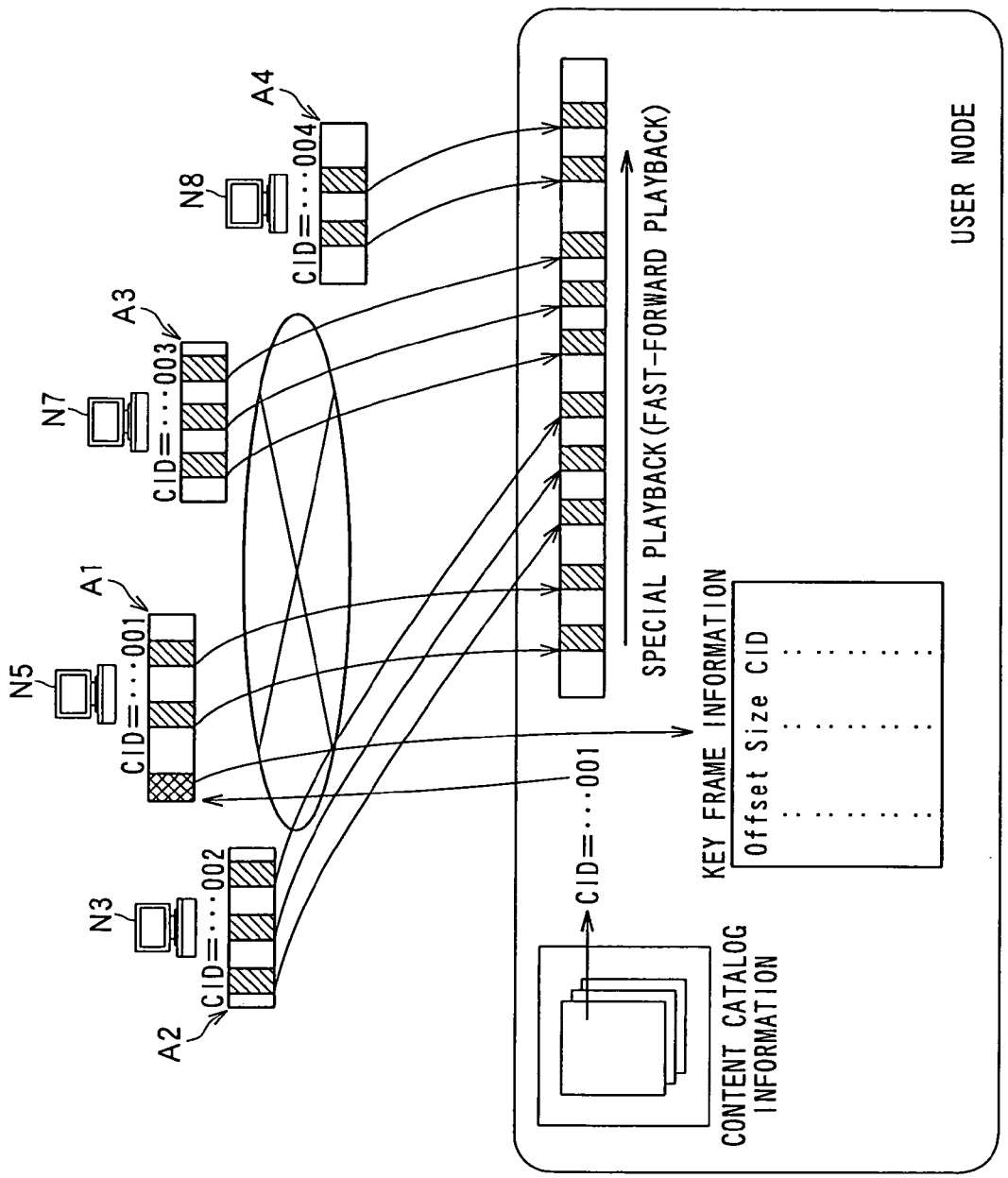
FIG. 17 is a diagram showing a state where fast-forward playback is performed using the content catalog information and the header of the divided content data (structure example 2) illustrated in FIG. 14.
Figure 18:
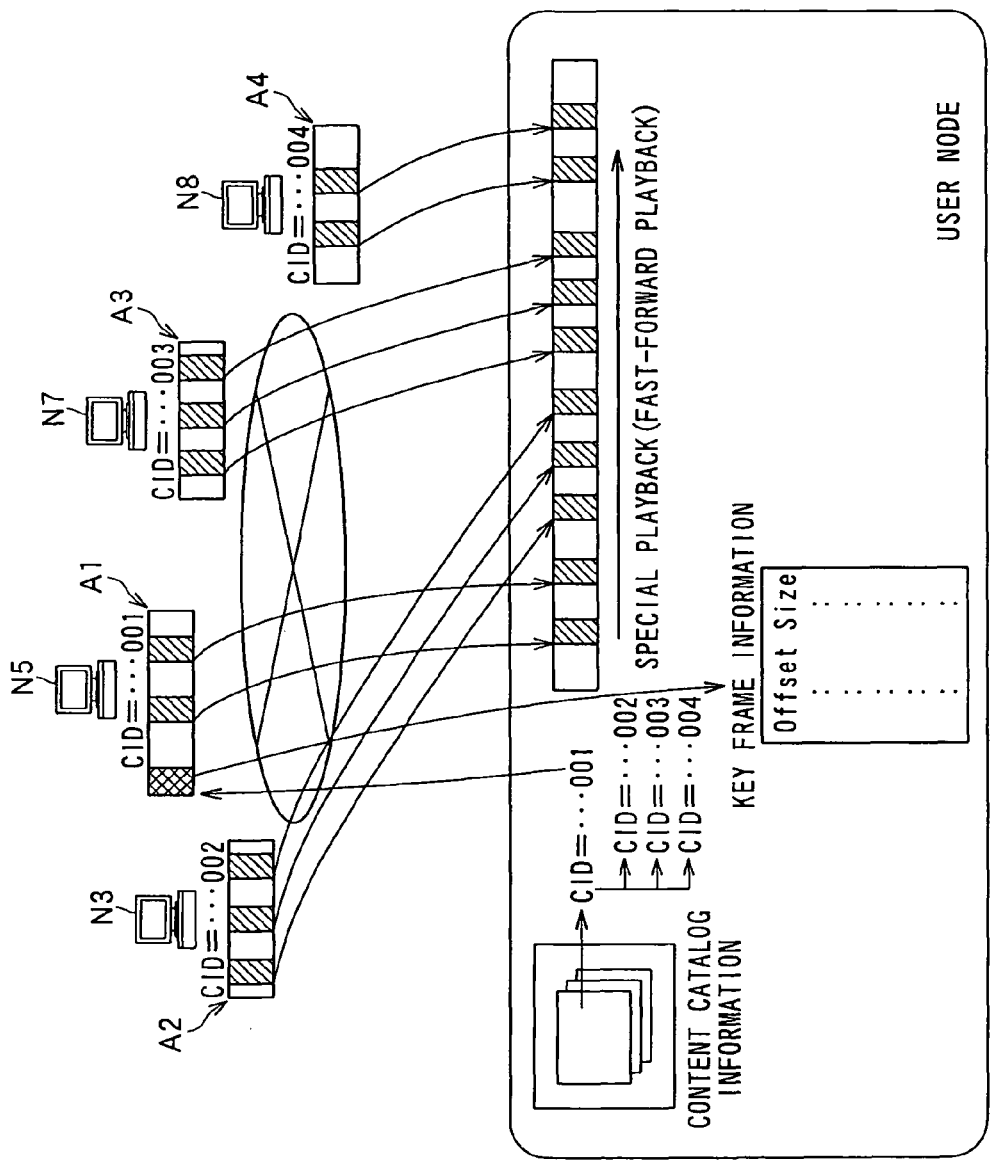
FIG. 18 is a diagram showing a state where fast-forward playback is performed using the content catalog information and the header of the divided content data (structure example 3) illustrated in FIG. 15.

In any of the examples of FIGS. 16 to 18, the user node obtains key frame information from divided content data (in the example, the divided content data at the head) including the key frame information, specifies key frame information corresponding to a key frame to be reproduced from the obtained key frame information in response to a content fast-forward playback instruction (an example of the instructions related to playback) from the user, and specifies the content ID of the divided content data including the key frame to be reproduced from, for example, the content catalog information or the like. The user node obtains the key frame corresponding to the specified key frame information and the content ID from a content holding node (which stores divided content data corresponding to the content ID specified by the user node, and which is specified by an inquiry sent to a root node by DHT routing using the content ID as a key), and reproduces the key frame (by fast-forward playback).

In the case of FIG. 16, divided content data (content ID) including a key frame to be reproduced is determined by calculation on the basis of the data size of the divided content data and key frame information (the offset position and the data size) of the key frame to be reproduced. On the other hand, in the case of FIG. 17, divided content data (content ID) including a key frame to be reproduced is specified from the key frame information. In the case of FIG. 18, a content ID other than that of the first (head) divided content data is obtained by calculation from the content ID of the first (head) divided content data.

Third Embodiment

In a third embodiment, to smoothly perform special playback (trick play) such as fast-forward playback, reverse playback, or seek (jump) playback on content data divided in a plurality of pieces and stored in different nodes Nn, key frame information indicative of an offset position (for example, position from the head) of each of key frames in each of the divided content data and data size is stored in any of the nodes Nn so that the node Nn can promptly specify which divided content data includes a key frame to be reproduced.

Figure 19A:
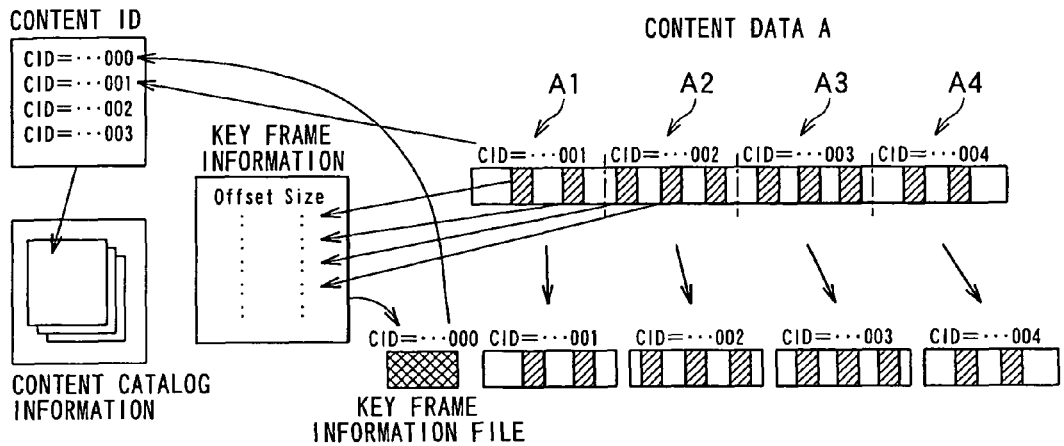
FIGS. 19A, 19B, and 19C are conceptual diagrams showing a state where content data is divided and key frame information of key frames in the divided content data is written in a key frame information file.
Figure 19B:
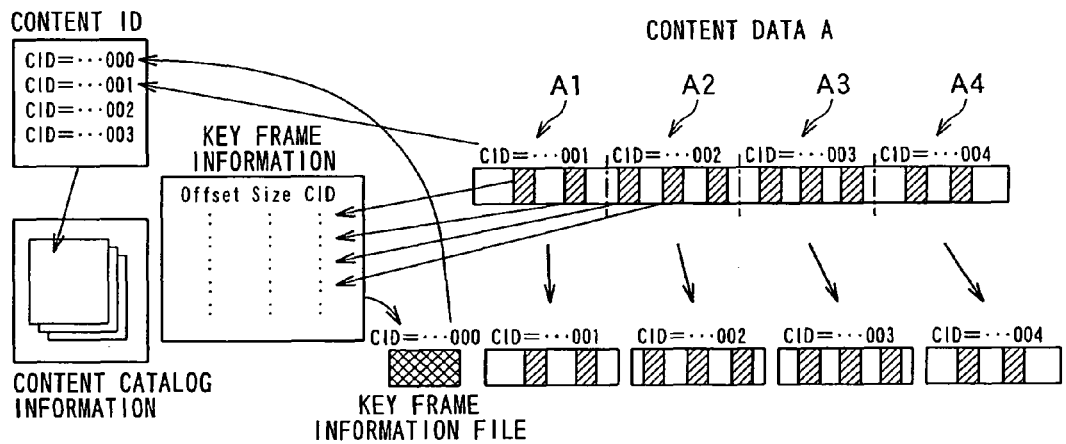
Figure 19C:
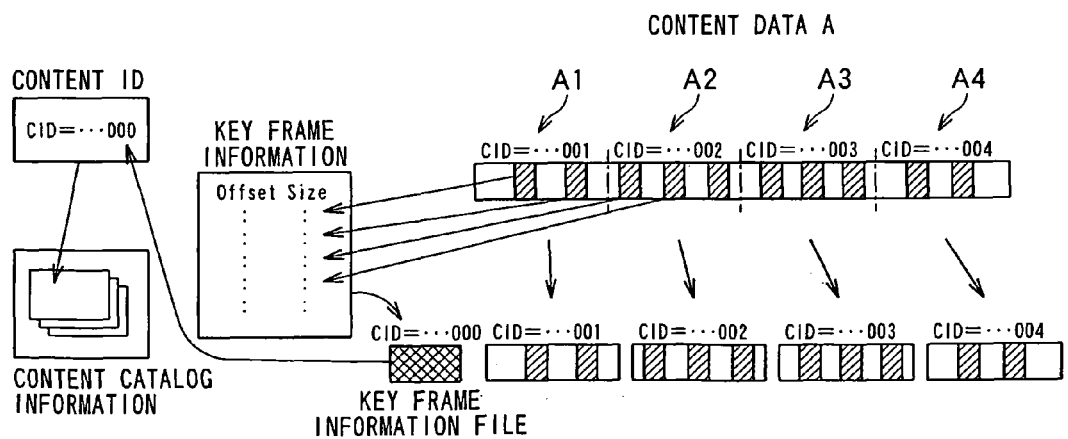

FIGS. 19A to 19C are conceptual diagrams showing a state where content data is divided and key frame information and the like of each of a key frame in each of the divided content data is written in a key frame information file.

In the example of FIG. 19A, the key frame information (offset position ("Offset") and data size ("Size")) corresponding to each of the key frames in each of the divided content data is written in the key frame information file and stored in the content holding node N1. FIG. 20 shows an example of the data structure of the content catalog information and the key frame information file (structure example 1) in the case of the example of FIG. 19A.

The content catalog information (structure example 1) shown in FIG. 20 has unique information of each of content data (A, B, C, ...) which can be obtained by each of the nodes Nn in the content distributed-storage system S. The unique information of each of the content data (A, B, C, ...) includes a content title (content name) and divided content information. The divided content information includes the division number of content data, the content ID of a key frame information file, and the content ID and data size of each of the first (head) to the m-th (m: natural number) divided content data.

The key frame information file (structure example 1) shown in FIG. 20 includes key frame information. The key frame information includes the number of key frames (the number of key frames in the content data) and the first (head) to the j-th (j: natural number) key frame information. Each of the key frame information includes the offset position of the key frame (the offset position from the head of the content data) and the data size of the key frame. With the key frame information file (structure example 1), the node Nn determines divided content data including a key frame by calculation. With the key frame information file (structure example 1), the correspondence relation between the offset position and the data size of a key frame and the content ID of divided content data including the key frame can be obtained by calculation without being specified in the key frame information file.

In the example of FIG. 19B, the content ID of each of the divided content data is included in the key frame information (offset position ("Offset") and data size ("Size")) corresponding to each of the key frames in each of the divided content data, and is written in the key frame information file so as to be associated with the offset position and the like. FIG. 21 shows an example of the data structure of the content catalog information and the key frame information file (structure example 2) in the case of the example of FIG. 19B.

The basic structure of the content catalog information (structure example 2) shown in FIG. 21 is similar to that of the content catalog information (structure example 1) shown in FIG. 20 except that divided content information includes the division number of content data, the content ID of a key frame information file, and the content IDs of the first (head) to the m-th (m: natural number) divided content data (the data size is not included).

Each of the key frame information in the key frame information file (structure example 2) shown in FIG. 21 includes the content ID of divided content data including a key frame so as to be associated with the offset position of the key frame (the offset position from the head of each of the divided content data) and the data size of the key frame. With the key frame information file (structure example 2), divided content data including a key frame can be specified more promptly without necessity of determination by calculation executed by the node Nn.

In the example of FIG. 19C, like the example of FIG. 19A, the key frame information (offset position ("Offset") and data size ("Size")) corresponding to each of the key frames in each of the divided content data is written in the key frame information file. FIG. 22 shows an example of the data structure of the content catalog information and the key frame information file (structure example 3) in the case of the example of FIG. 19C.

The basic structure of the content catalog information (structure example 3) shown in FIG. 22 is similar to that of the content catalog information (structure example 1) shown in FIG. 20 except that divided content information includes the division number of content data, the content ID of the key frame information file, and the division data size. That is, in the content catalog information (structure example 3), the content IDs of all of the divided content data are not included, but only the content ID of the first key frame information file is included. The content IDs of divided content data other than the content ID of the key frame information file is obtained by calculation from the content ID of the key frame information file. The division data size is information of the data size by which the content data is divided (the data size of the divided content data is the same). Consequently, since the content IDs of all of the divided content data do not have to be included, the data amount can be reduced.

The details of each of key frame information in the key frame information file (structure example 3) shown in FIG. 22 are similar to those of each of the key frame information in the key frame information file (structure example 1) shown in FIG. 20.

Outline of the fast-forward playback will be described using the content catalog information with reference to FIGS. 23 to 25.

Figure 23:
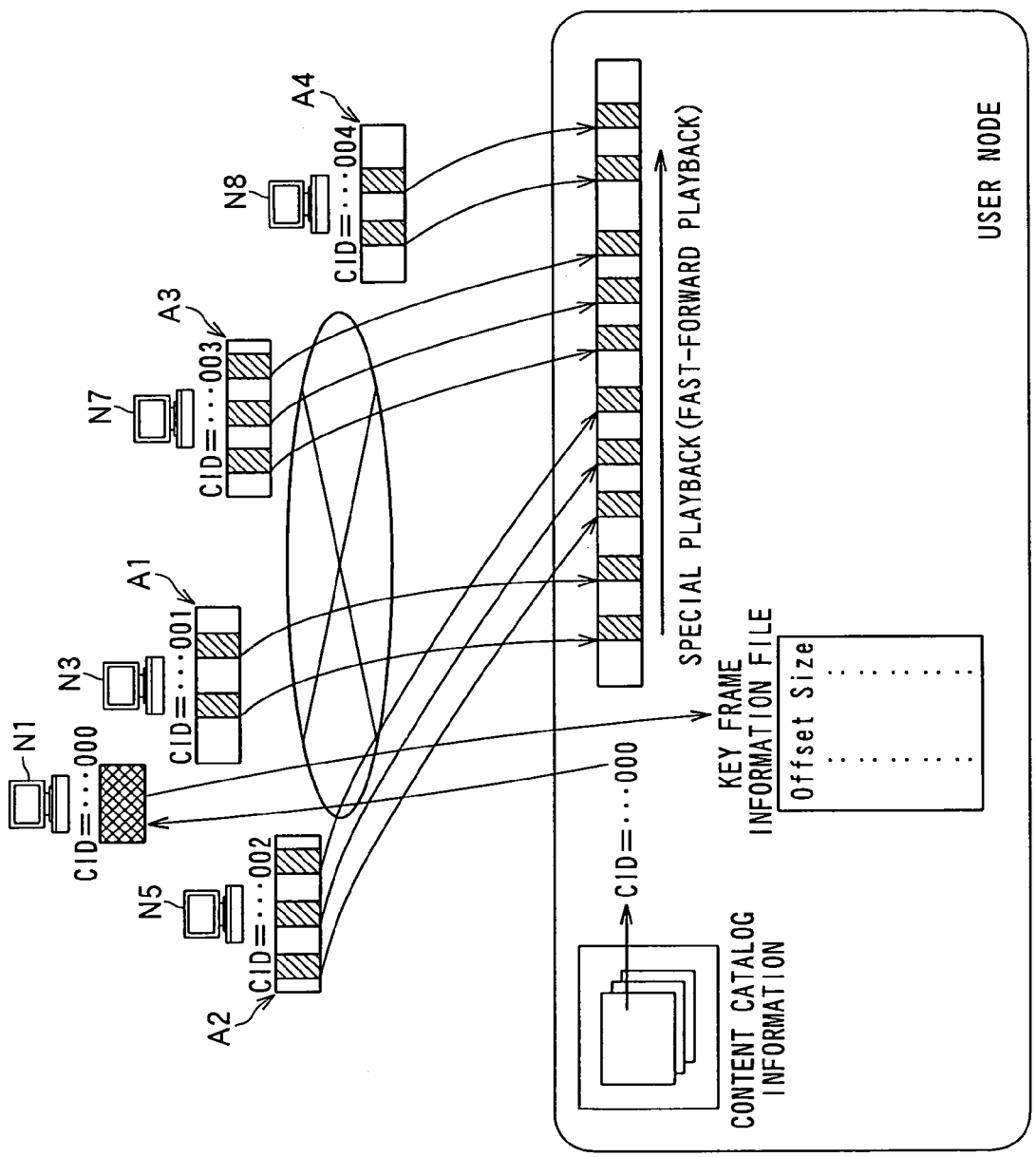
FIG. 23 is a diagram showing a state where fast-forward playback is performed using the content catalog information and the key frame information file (structure example 1) illustrated in FIG. 20.

FIG. 23 is a diagram showing a state where fast-forward playback is performed using the content catalog information and the key frame information file (structure example 1) illustrated in FIG. 20. FIG. 24 is a diagram showing a state where fast-forward playback is performed using the content catalog information and the key frame information file (structure example 2) illustrated in FIG. 21. FIG. 25 is a diagram showing a state where fast-forward playback is performed using the content catalog information and the key frame information file (structure example 3) illustrated in FIG. 22.

Figure 24:
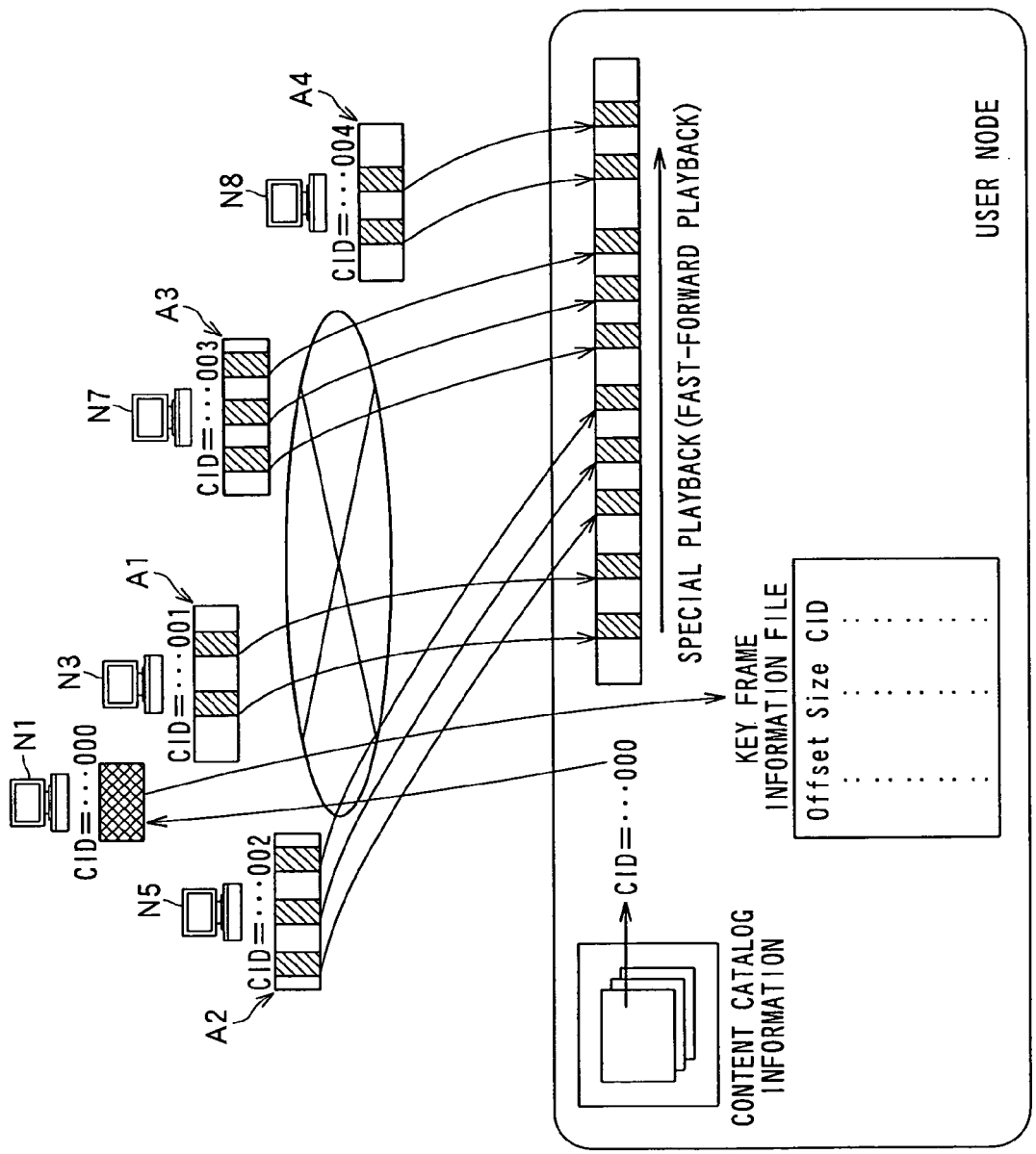
FIG. 24 is a diagram showing a state where fast-forward playback is performed using the content catalog information and the key frame information file (structure example 2) illustrated in FIG. 21.
Figure 25:
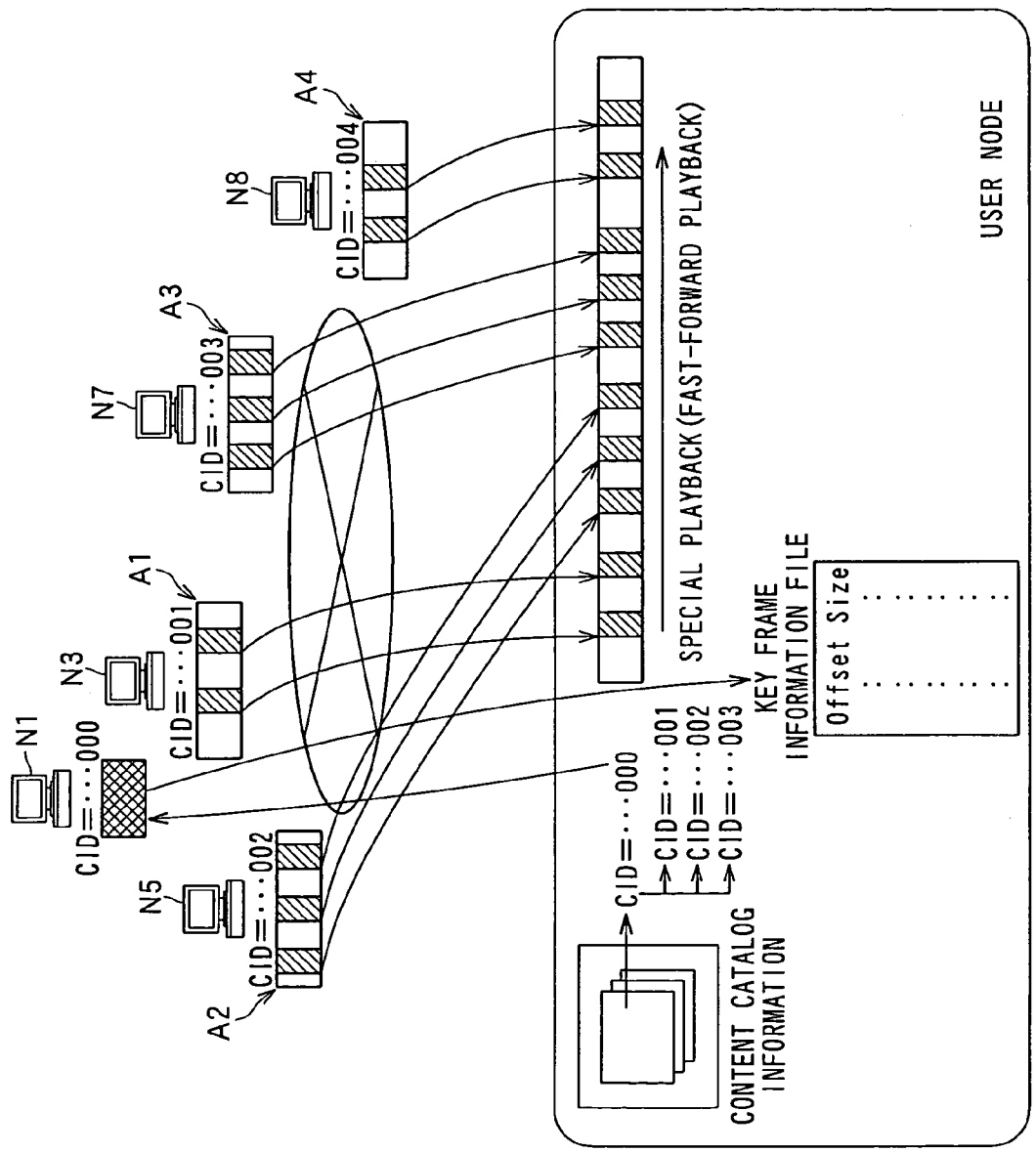
FIG. 25 is a diagram showing a state where fast-forward playback is performed using the content catalog information and the key frame information file (structure example 3) illustrated in FIG. 22.

In any of the examples of FIGS. 23 to 25, the user node obtains a key frame information file including key frame information, specifies key frame information corresponding to a key frame to be reproduced from the obtained key frame information file in response to a content fast-forward playback instruction (an example of the instructions related to playback) from the user, and specifies the content ID of the divided content data including the key frame to be reproduced from, for example, the content catalog information or the like. The user node obtains the key frame corresponding to the specified key frame information and the content ID from a content holding node (which stores divided content data corresponding to the content ID specified by the user node, and which is specified by an inquiry sent to a root node by DHT routing using the content ID as a key), and reproduces the key frame (by fast-forward playback).

In the case of FIG. 23, divided content data (content ID) including a key frame to be reproduced is determined by calculation on the basis of the data size of the divided content data and key frame information (the offset position and the data size) of the key frame to be reproduced. On the other hand, in the case of FIG. 24, divided content data (content ID) including a key frame to be reproduced is specified from the key frame information. In the case of FIG. 25, a content ID of divided content data other than that of a key frame information file is obtained by calculation from the content ID of the key frame information file.

2. Configuration, Function, and the Like of Node Nn

The configuration and function of the node Nn will be described with reference to FIG. 26.

Figure 26:
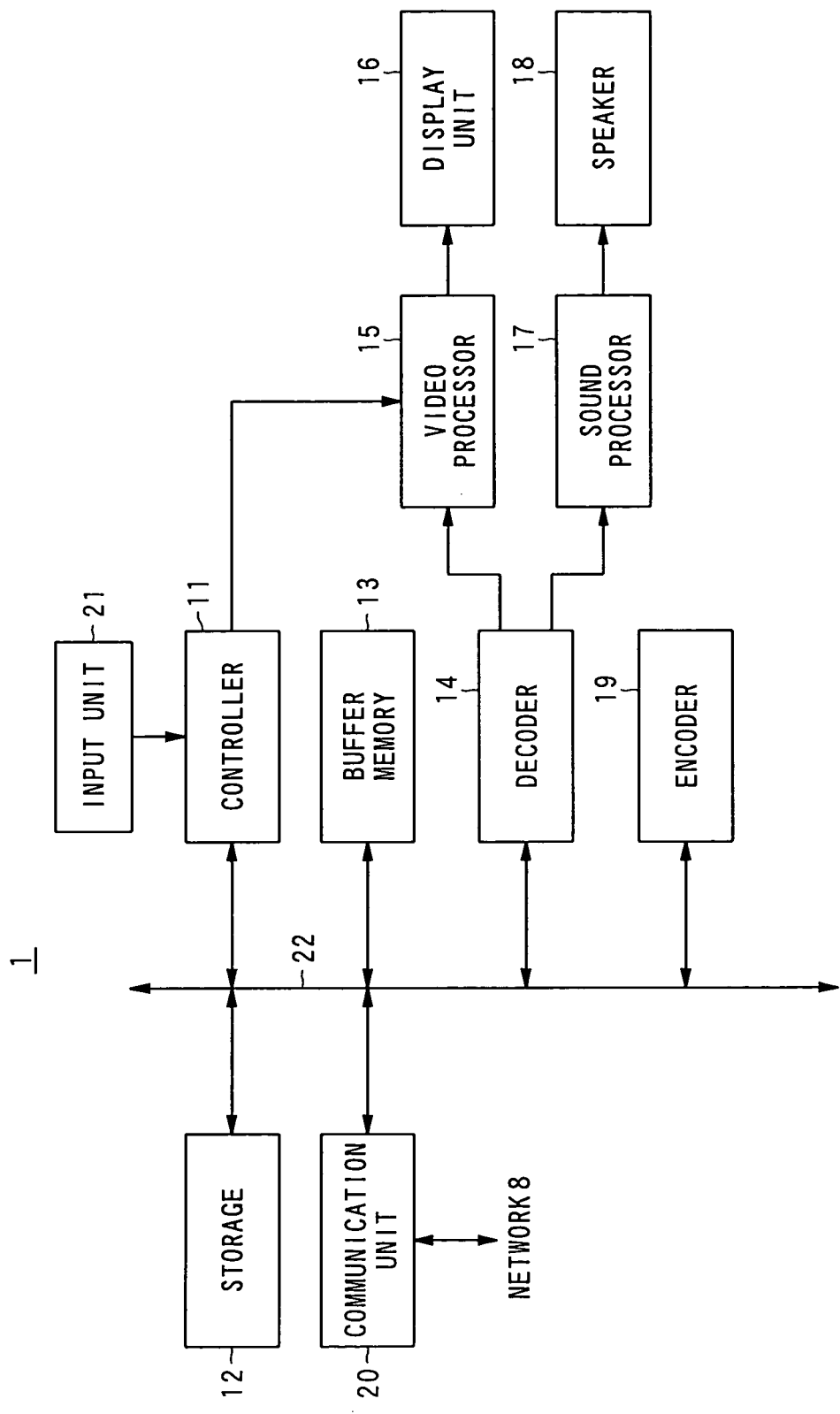
FIG. 26 is a diagram showing an example of the schematic configuration of a node Nn.

FIG. 26 is a diagram showing a schematic configuration example of the node Nn.

As shown in FIG. 26, each node Nn includes: a controller 11 as a computer constructed by a CPU having a computing function, a work RAM, a ROM for storing various data and programs, and the like; a storage 12 as storing means constructed by an HD or the like for storing various data (for example, divided content data, index information, a DHT, and the like), various programs, and the like; a buffer memory 13 for temporarily storing received divided content data and the like; a decoder 14 for decoding (decompressing, decrypting, or the like) encoded video data (video information) and audio data (sound information) and the like included in the divided content data; a video processor 15 for performing a predetermined drawing process on the decoded video data and the like and outputting the resultant data as a video signal; a display unit 16 such as a CRT or a liquid crystal display for displaying a video image on the basis of the video signal output from the video processor 15; a sound processor 17 for digital-to-analog (D/A) converting the decoded audio data to an analog audio signal, amplifying the analog audio signal by an amplifier, and outputting the amplified signal; a speaker 18 for outputting the audio signal output from the sound processor 17 as sound waves; a communication unit 20 for performing communication control on information to/from another node Nn via the network 8; and an input unit (such as a keyboard, a mouse, and an operation panel) 21 for receiving an instruction from the user and supplying an instruction signal according to the instruction to the controller 11. The controller 11, the storage 12, the buffer memory 13, the decoder 14, and the communication unit 20 are connected to each other via a bus 22. As a node Nn, a personal computer, an STB (Set Top Box), a TV receiver, or the like can be applied.

In such a configuration, the controller 11 controls, in a centralized manner, the whole system by reading and executing a program stored on the storage 12 or the like by the CPU, and performs a process as any one of the user node, the relay node, the root node, the cache node, and the content holding node by participating in the content distributed-storage system S.

Further, by reading and executing a program (including a node process program of the present invention) stored in the storage 12 and the like by the CPU, the controller 11 in the node Nn participating in the content distributed-storage system S functions as instruction receiving means, specifying means, frame obtaining means, key frame information obtaining means, instruction receiving means, frame obtaining means, and the like of the present invention, and performs a process which will be described later. The node process program may be, for example, downloaded from a predetermined server on the network 8, or recorded on a recording medium such as a CD-ROM and read via a drive of the recording medium.

3. Process at the Time of Special Playback in the Node Nn

The special playback process in the node Nn in the first to third embodiments will be described with reference to FIGS. 27 to 34 and the like.

Figure 27:
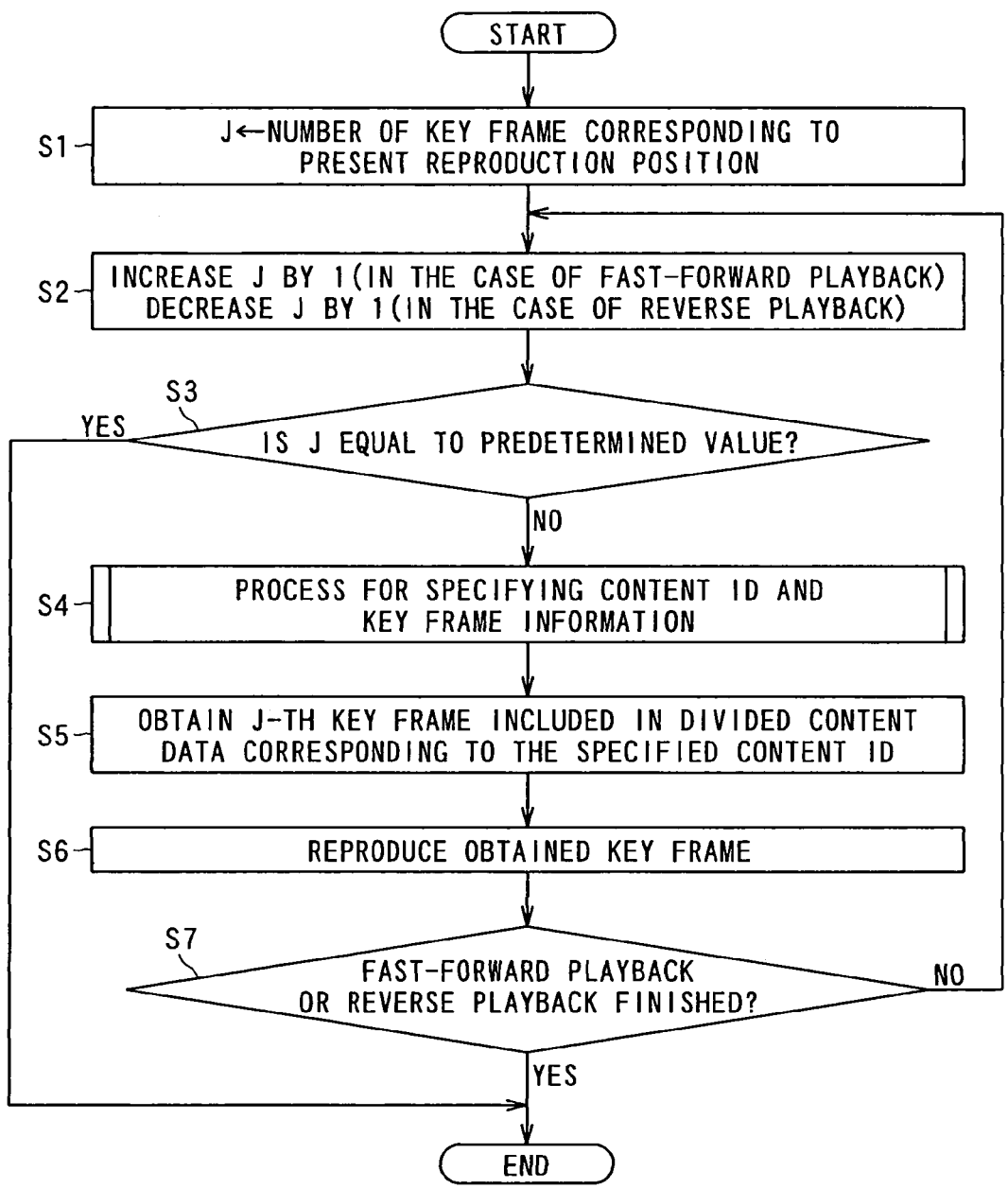
FIG. 27 is a flowchart showing fast-forward playback or reverse playback process in a control unit 11 in the node Nn.
Figure 28:
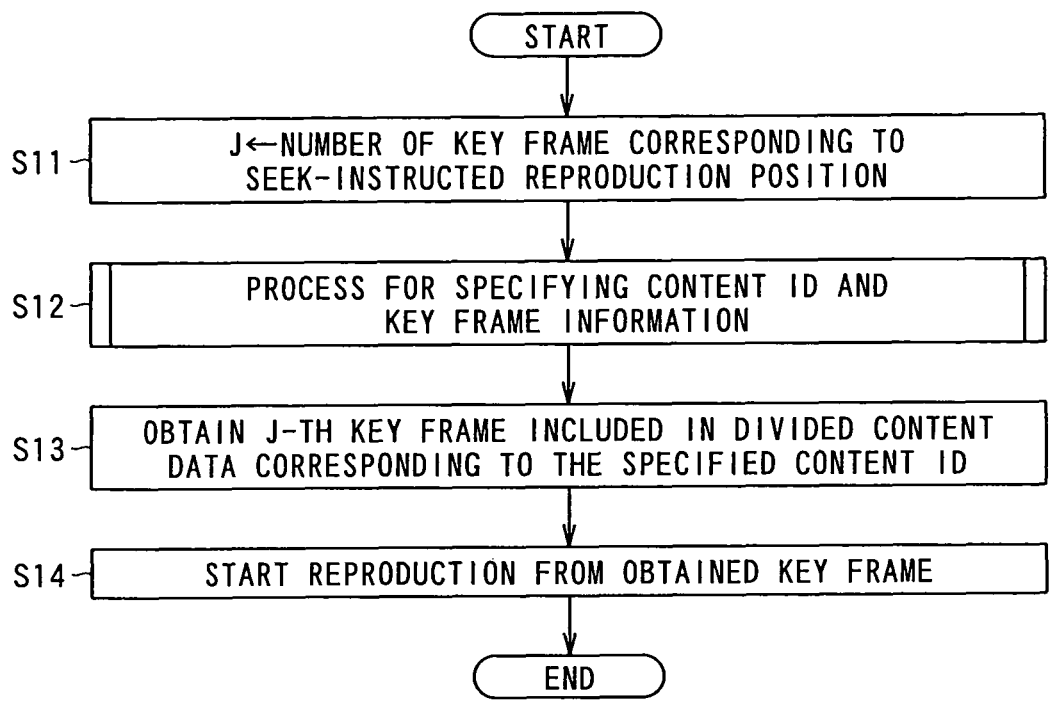
FIG. 28 is a flowchart showing a seek (jump) reproducing process in the control unit 11 in the node Nn.
Figure 29:
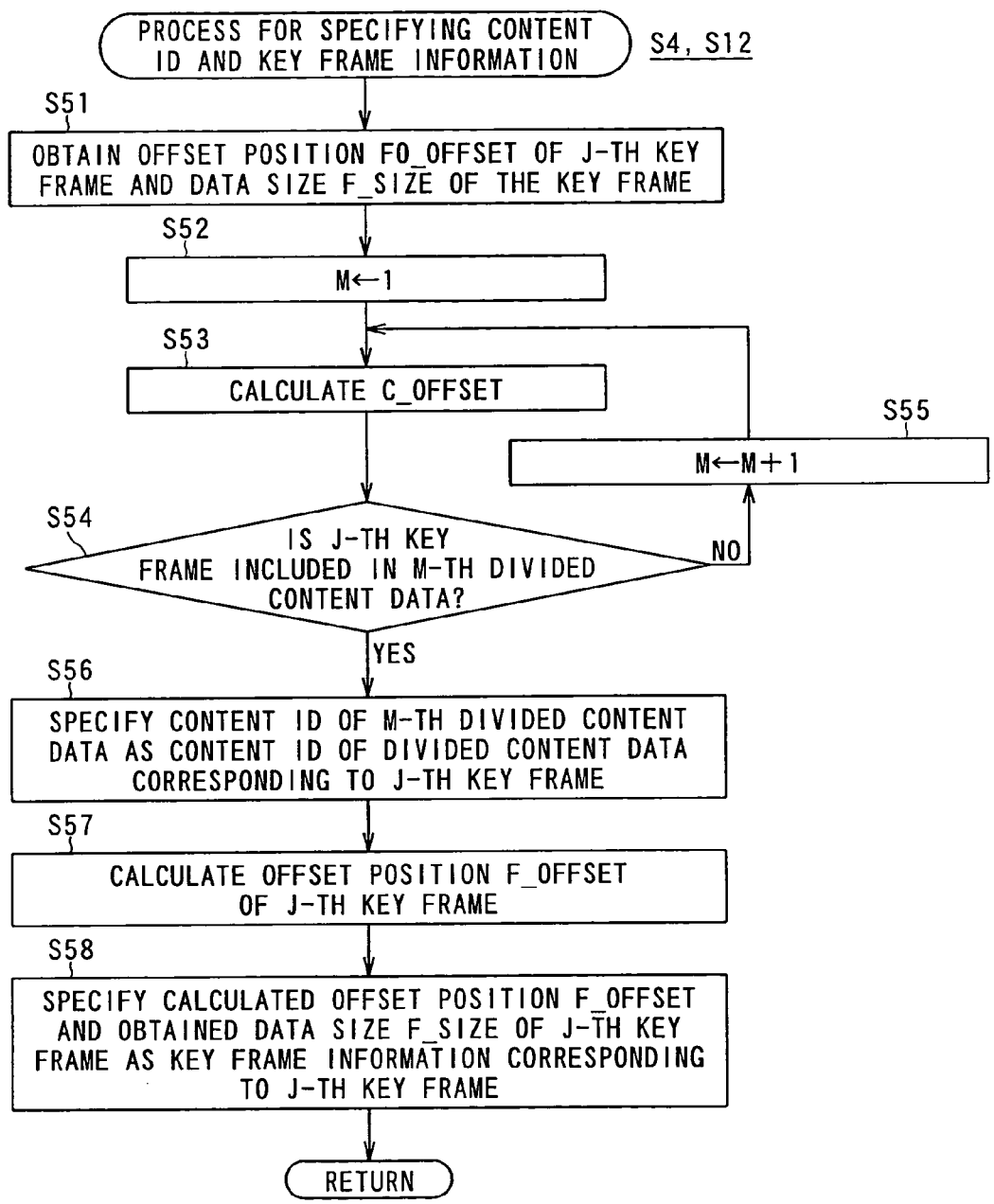
FIG. 29 is a flowchart showing key frame information and content ID specifying process.
Figure 30:
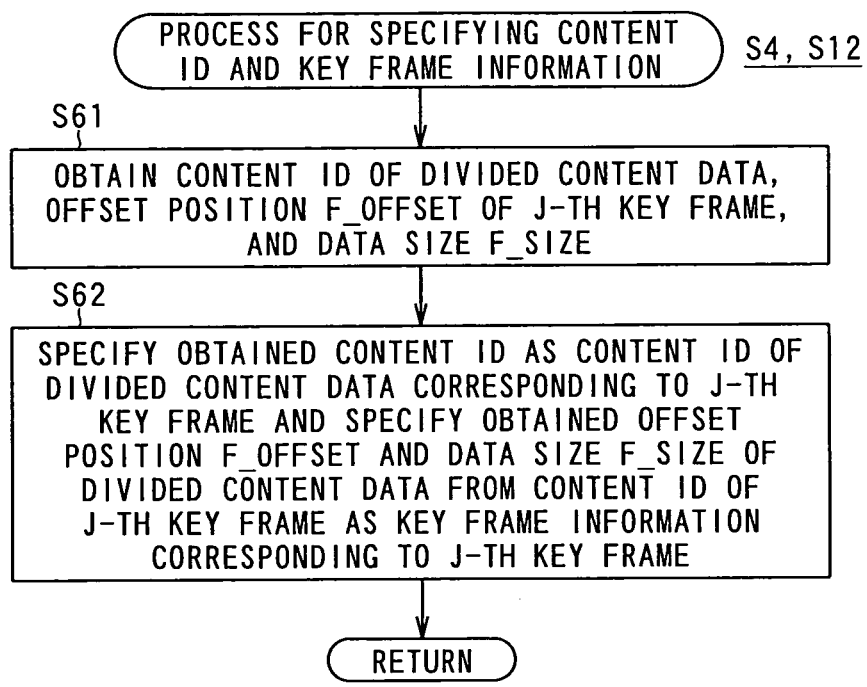
FIG. 30 is a flowchart showing the key frame information and content ID specifying process.
Figure 31:
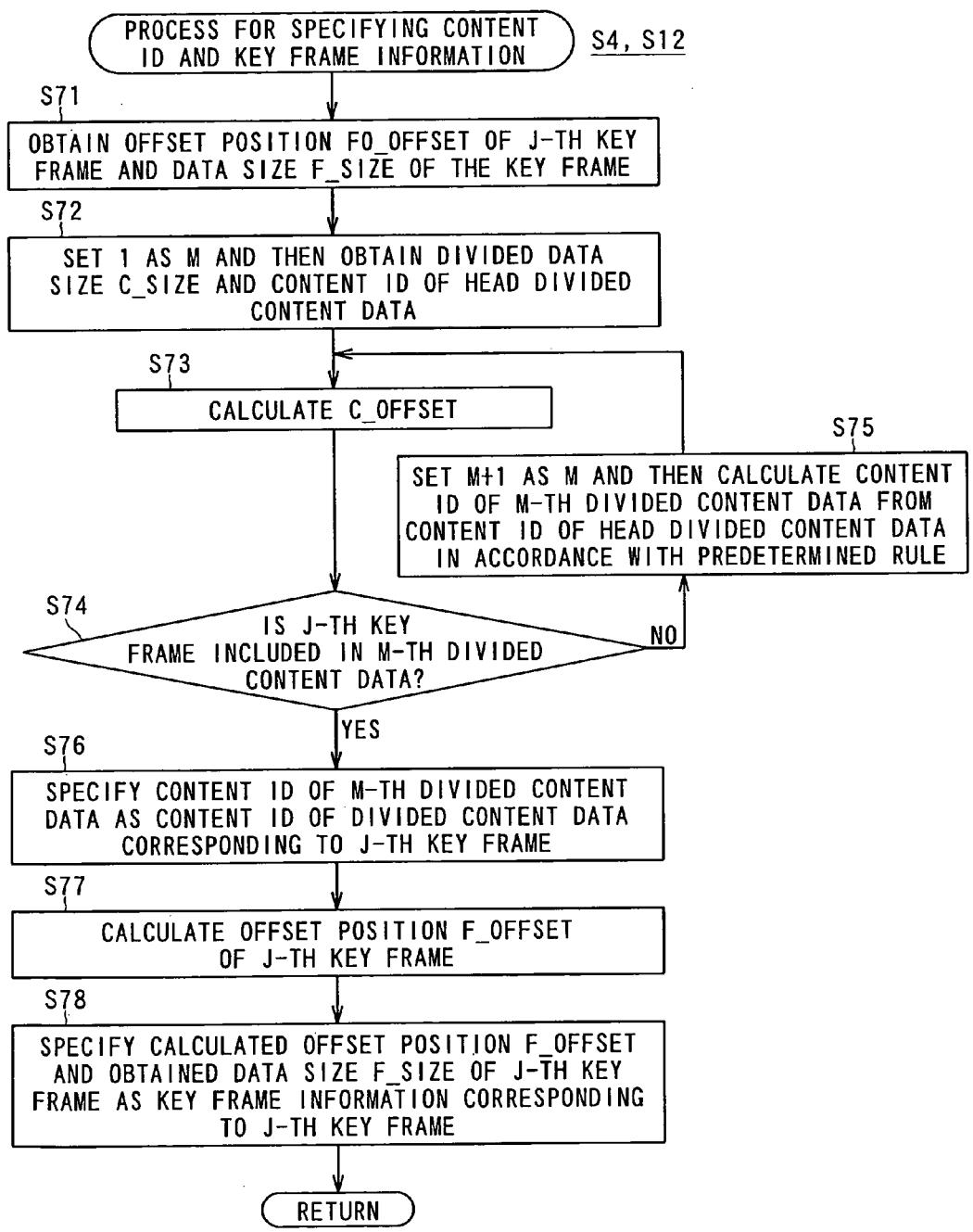
FIG. 31 is a flowchart showing the key frame information and content ID specifying process.

FIG. 27 is a flowchart showing fast-forward playback or reverse playback process in the controller 11 of the node Nn. FIG. 28 is a flowchart showing seek (jump) playback process in the controller 11 of the node Nn. FIG. 29 is a flowchart showing process of specifying key frame information and a content ID in the case of using the structure example 1. FIG. 30 is a flowchart showing process of specifying key frame information and a content ID in the case of using the structure example 2. FIG. 31 is a flowchart showing process of specifying key frame information and a content ID in the case of using the structure example 3. FIGS. 27 to 31 are common to the first to third embodiments.

Figure 32:
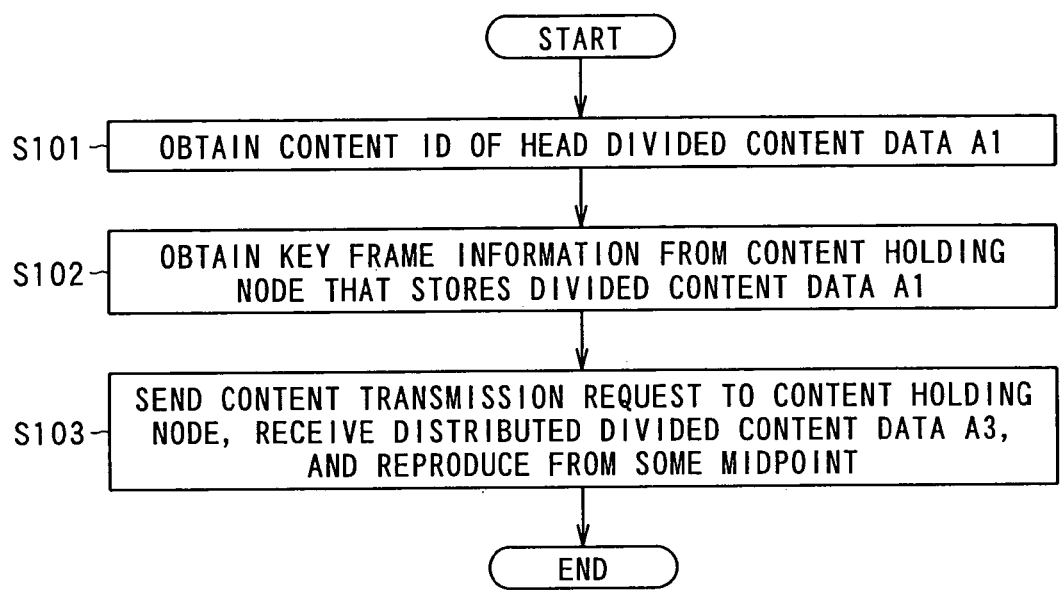
FIG. 32 is a flowchart showing intermediate playback process in the control unit 11 in the node Nn in the case where the key frame information is included only in the header of the divided content data at the head.
Figure 33:
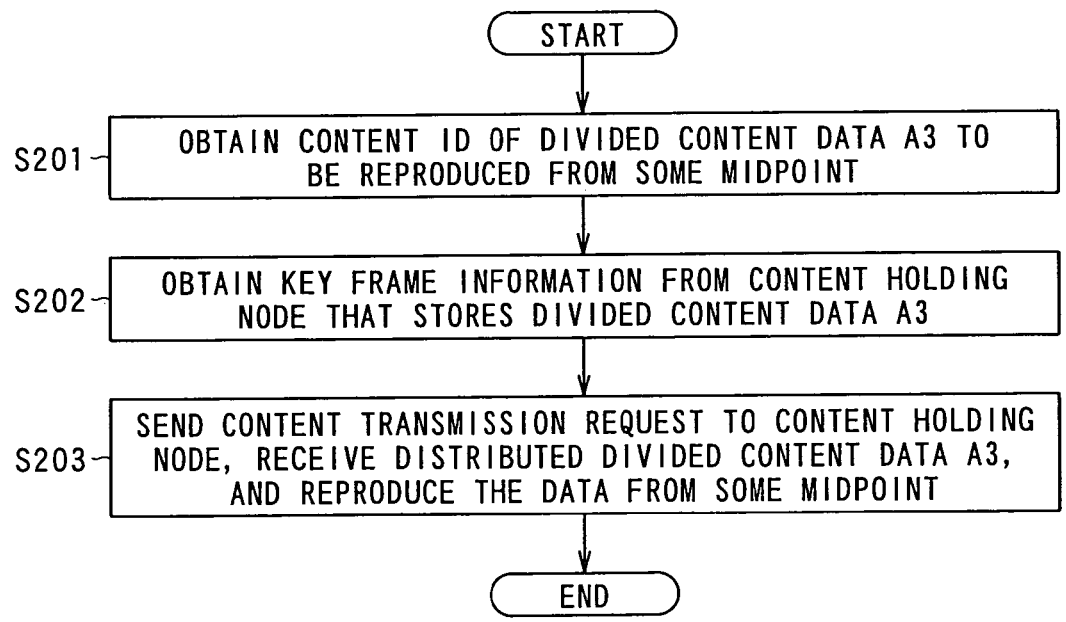
FIG. 33 is a flowchart showing the intermediate playback process in the control unit 11 in the node Nn in the case where the key frame information is included in the headers of all of the divided content data.

FIG. 32 is a flowchart showing intermediate playback process in the controller 11 of the node Nn in the case where the key frame information is included only in the header of divided content data at the head in the second embodiment. FIG. 33 is a flowchart showing intermediate playback process in the controller 11 of the node Nn in the case where the key frame information is included in the headers of all of divided content data in the second embodiment.

Figure 34:
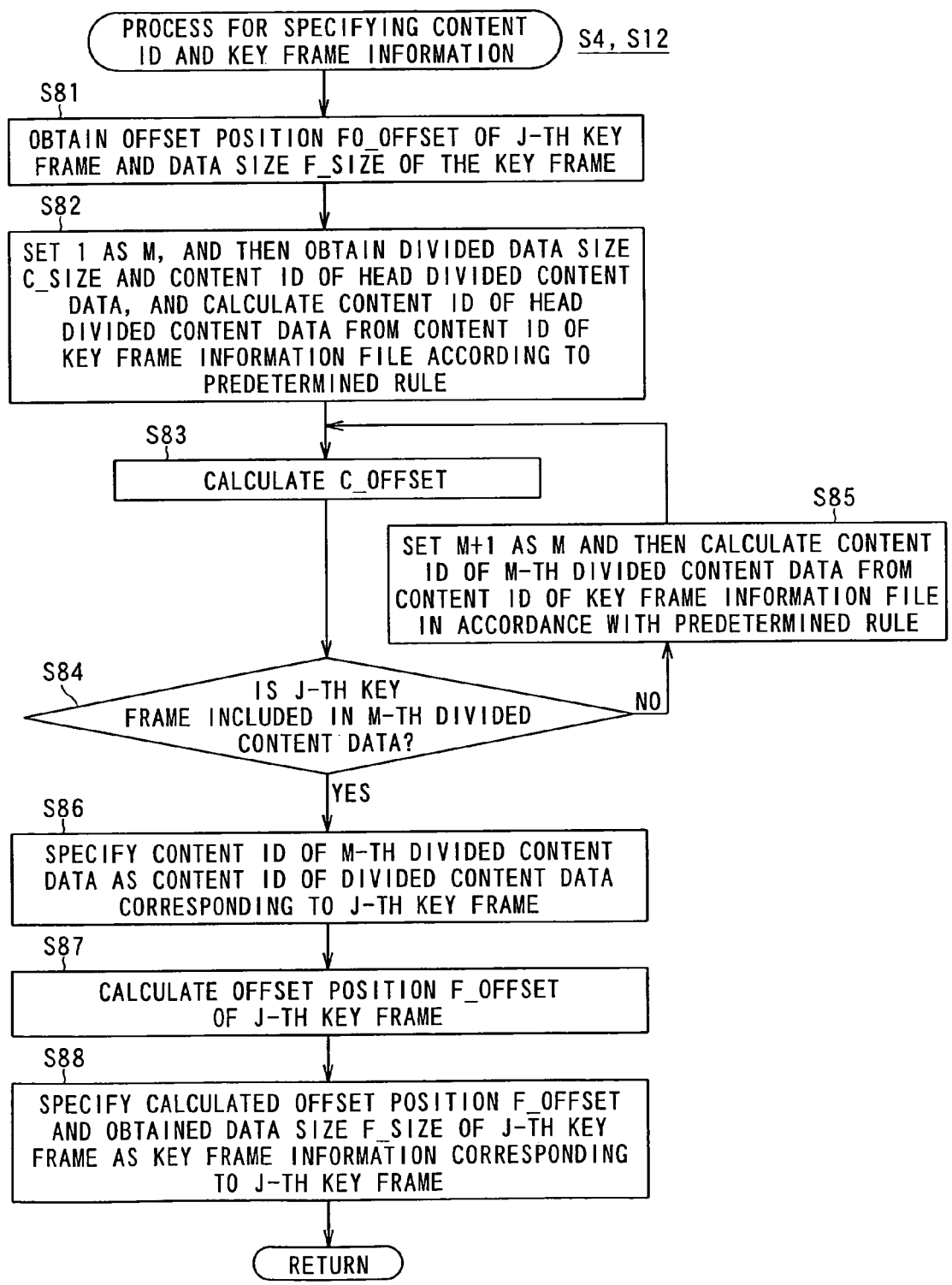
FIG. 34 is a flowchart showing key frame information and content ID specifying process.

FIG. 34 is a flowchart showing process of specifying key frame information and a content ID in the case of using the structure example 3 in the third embodiment.

First Embodiment

In the first embodiment, first, in the case where the controller 11 receives a content list display instruction via the input unit 21 from the user in a node Nn (user node) participating in the content distributed-storage system S, the controller 11 reads the content catalog information from the storage 12 and loads it to the RAM and displays a content list in which a plurality of content names (content titles) included in the content catalog information are written on the display unit 16. In the case where the user selects one of the content names in the displayed content list via the input unit 21, the controller 11 generates a message (query) for inquiring (retrieving) the location of content including the content ID of divided content data A1 as a component of content data A corresponding to the content name and the node information of the node itself. The controller 11 transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node. The controller 11 of the user node requests for content transmission to the content holding node that stores the divided content data A1 in accordance with the obtained node information, for example, receives packet data of the divided content data A1 which is streaming-distributed, and reproduces (normal playback) the packet data via the decoder 14, the video processor 15, the sound processor 17, and the like. In such a manner, as described above, the object to be streaming-distributed changes in order of the divided content data A1, the divided content data A2, the divided content data A3, . . . .

In the case of using the content catalog information (structure example 3) shown in FIG. 8 in the first embodiment, since only the content ID of the divided content data at the head is included, the content ID of any of the other divided content data is calculated by, for example, substituting the order from the head divided content data and the content ID of the head divided content data into a predetermined function.

Fast-Forward Playback or Reverse Playback

In the case where the controller 11 receives an instruction to start the fast-forward playback or reverse playback (an example of the instructions related to reproduction of content data) from the user via the input unit 21 during normal playback, the controller 11 starts the process shown in FIG. 27. First, the controller 11 obtains the number (the order from the head) of a key frame corresponding to a playback position of divided content data at present, and sets the number to "J" (step S1).

Subsequently, the controller 11 increases J by one in the fast-forward playback or, on the other hand, decreases J by one in the reverse playback (step S2).

The controller 11 determines whether J becomes a predetermined value or not (step S3). Concretely, in the case of the fast-forward playback, the controller 11 determines whether J becomes equal to the number of key frames or not with reference to content catalog information. In the case where J becomes equal to the number of key frames (J=the number of key frames) (Y in step S3), since the key frame corresponding to the playback position is the last key frame, the controller 11 finishes the process. On the other hand, when J is not equal to the number of key frames (J<the number of key frames) (N in step S3), the controller 11 moves to step S4.

On the other hand, in the case of the reverse playback, the controller 11 determines whether J becomes equal to "1" or not with reference to the content catalog information. In the case where J becomes equal to "1" (J=1) (Y in step S3), the key frame corresponding to the playback position is the first key frame, the controller 11 finishes the process. On the other hand, in the case where J is not equal to "1" (J>1) (N in step S3), the controller 11 moves to step S4.

In step S4, the controller 11 specifies key frame information corresponding to the J-th key frame and the content ID of divided content data corresponding to the J-th key frame (that is, divided content data including the key frame). The process of specifying the content ID and the key frame information varies according to the structure examples 1 to 3. The details will be described later.

Subsequently, the controller 11 obtains the J-th key frame included in the divided content data corresponding to the specified content ID (step S5). More concretely, the controller 11 determines whether the divided content data corresponding to the specified content ID is stored or not and, in the case where the divided content data is stored, obtains a key frame corresponding to the specified key frame information from the divided content data. On the other hand, in the case where the divided content data corresponding to the specified content ID is not stored, the controller 11 generates a message (query) for inquiring (retrieving) the location of a key frame including the content ID and the node information of itself and transmits the message to another node Nn in accordance with a routing table using the DHT of the user node itself. The key frame location inquiry (retrieval) message finally reaches the root node by DHT routing using the content ID as a key. The controller 11 of the user node obtains node information of a content holding node from the root node. The controller 11 sends a key frame transmission request designating the specified key frame information to a content holding node that holds the divided content data in accordance with the obtained node information and obtains the key frame transmitted in response to the request.

Subsequently, the controller 11 reproduces the obtained key frame via the decoder 14 and the video processor 15 (step S6).

The controller 11 determines whether an instruction to finish the fast-forward playback or reverse playback is received via the input unit 21 from the user or not (step S7). In the case where the instruction is received (Y in step S7), the controller 11 finishes the process. In the case where the instruction is not received (N in step S7), the controller 11 returns to step S2 and performs processes similar to the above. The fast-forward playback or reverse playback is performed until J becomes a predetermined value or the fast-forward playback or reverse playback finishing instruction is received.

Seek (Jump) Playback

In the case where the controller 11 receives an instruction to start the seek (jump) playback (an example of the instructions related to reproduction of content data) from the user via the input unit 21 during normal playback, the controller 11 starts the process shown in FIG. 14. First, the controller 11 obtains the number (the order from the head) of a key frame corresponding to a playback position of divided content data to be sought by the controller 11 (to which the controller 11 is going to jump), and sets the number to "J" (step S11).

Subsequently, the controller 11 specifies key frame information corresponding to the J-th key frame and the content ID of divided content data corresponding to the J-th key frame (step S12). The details of the process of specifying the content ID and the key frame information is similar to that in the step S4 in the fast-forward playback or reverse playback process. The details will be described later.

Subsequently, the controller 11 obtains the J-th key frame included in the divided content data corresponding to the specified content ID (step S13), starts playback (jump playback) from the key frame (step S14), and finishes the process (after that, returns to the normal playback).

More concretely, the controller 11 determines whether the divided content data corresponding to the specified content ID is stored or not. In the case where the divided content data is stored, the controller 11 obtains a key frame corresponding to the specified key frame information from the divided content data and starts the reproduction from the key frame. On the other hand, in the case where the divided content data corresponding to the specified content ID is not stored, the controller 11 generates a message (query) for inquiring (retrieving) the location of a key frame including the content ID and the node information of itself and transmits the message to another node Nn in accordance with a routing table using the DHT of the user node itself. The key frame location inquiry (retrieval) message finally reaches the root node by DHT routing using the content ID as a key. The controller 11 of the user node obtains node information of a content holding node from the root node. The controller 11 sends a request for transmission from a key frame while designating the specified key frame information to a content holding node that holds the divided content data in accordance with the obtained node information. The controller 11 obtains a key frame transmitted in response to the request, and starts reproduction from the key frame. After that, the controller 11 receives streaming distribution of data following the key frame, and performs normal playback.

The details of the process of specifying the content ID and key frame information in the steps S4 and S12 in the case of using the content catalog information in the structure examples 1 to 3 in the first embodiment will now be described.

(The Case of Using Content Catalog Information of Structure Example 1)

In this case, as shown in FIG. 29, first, the controller 11 refers to the content catalog information illustrated in FIG. 6 and obtains an offset position F0_OFFSET (offset position from the head of content data) of the J-th key frame and data size F_SIZE of the key frame from the J-th key frame information (step S51).

Subsequently, the controller 11 sets "1" to a variable "M" (step S52). The controller 11 refers to the content catalog information shown in FIG. 6, obtains data size C_SIZE and content ID of the M-th divided content data (in the case of M=1, the head divided content data) from the divided content information, and calculates an offset position C_OFFSET (in the case of M=1, "0") of the M-th divided content data (step S53).

After that, the controller 11 determines whether the J-th key frame is included in the M-th divided content data or not (step S54). Concretely, the controller 11 determines whether F0_OFFSET<C_OFFSET+C_SIZE is satisfied or not (that is, whether the position indicated by C_OFFSET+C_SIZE (the end position of the M-th divided content data) is larger than (behind) the offset position F0_OFFSET of the J-th key frame or not).

In the case where the J-th key frame is not included in the M-th divided content data (that is, in the case where F0_OFFSET<C_OFFSET+C_SIZE is not satisfied) (N in step S54), the controller 11 adds "1" to "M" (step S55), returns to step S53, calculates the offset position C_OFFSET of the M-th divided content data, obtains the data size C_SIZE and the content ID of the M-th divided content data, and performs processes similar to the above. In such a manner, on the basis of the data size C_SIZE of the divided content data, the offset position F0_OFFSET of the J-th key frame, and the like, divided content data including the J-th key frame is determined.

In the case where the J-th key frame is included in the M-th divided content data (that is, F0_OFFSET<C_OFFSET+C_SIZE is satisfied) (Y in step S54), the controller 11 specifies the content ID of the M-th divided content data (the content ID obtained at last) as the content ID of the divided content data corresponding to the J-th key frame (step S56).

Subsequently, the controller 11 calculates the offset position F_OFFSET of the J-th key frame (the offset position from the head of the M-th divided content data) (that is, F_OFFSET=F0_OFFSET−C_OFFSET) (step S57), and specifies the calculated offset position F_OFFSET and the data size F_SIZE of the J-th key frame obtained in the step S51 as key frame information corresponding to the J-th key frame (step S58).

(The Case of Using Content Catalog Information of Structure Example 2)

In this case, as shown in FIG. 30, first, the controller 11 refers to the content catalog information illustrated in FIG. 7 and obtains the content ID of divided content data, an offset position F_OFFSET (offset position from the head of divided content data) of the J-th key frame, and data size F_SIZE from the J-th key frame information (step S61). The controller 11 specifies the obtained content ID as the content ID of divided content data corresponding to the J-th key frame, and specifies the offset position F_OFFSET and the data size F_SIZE obtained of the J-th key frame as key frame information corresponding to the J-th key frame (step S62).

(The Case of Using Content Catalog Information of Structure Example 3)

In this case, as shown in FIG. 31, first, the controller 11 refers to the content catalog information illustrated in FIG. 8 and obtains the offset position F0_OFFSET (offset position from the head of content data) of the J-th key frame and data size F_SIZE of the key frame from the J-th key frame information (step S71).

Subsequently, the controller 11 sets "1" to the variable "M", refers to the content catalog information shown in FIG. 8, and obtains divided data size C_SIZE and the content ID of the divided content data at the head (step S72).

After that, the controller 11 calculates an offset position C_OFFSET (in the case of M=1, "0") of the M-th divided content data (in the case where M=1, the head divided content data) (step S73).

The controller 11 determines whether the J-th key frame is included in the M-th divided content data or not (step S74). Like the step S54, concretely, the controller 11 determines whether F0_OFFSET<C_OFFSET+C_SIZE is satisfied or not.

In the case where the J-th key frame is not included in the M-th divided content data (that is, in the case where F0_OFFSET<C_OFFSET+C_SIZE is not satisfied) (N in step S74), the controller 11 adds "1" to "M", calculates the content ID of the M-th divided content data from the content ID of the divided content data at the head in accordance with a predetermined rule (step S75), and returns to step S73.

When it is set so that content IDs of a plurality of pieces of divided content data constructing content data of a single unit have regularity, the content ID of divided content data other than the head divided content data can be calculated by substituting the order M from the head of the divided content data and the content ID of the head divided content data to a predetermined function (in a simple example, a value obtained by adding M×A (A is an arbitrary value) to the content ID at the head (M=1) becomes the content ID of the M-th (M≥2) divided content data).

In the case where the J-th key frame is included in the M-th divided content data (that is, F0_OFFSET<C_OFFSET+C_SIZE is satisfied) (Y in step S74), the controller 11 specifies the content ID of the M-th divided content data (the content ID obtained or calculated at last) as the content ID of the divided content data corresponding to the J-th key frame (step S76).

Subsequently, the controller 11 calculates the offset position F_OFFSET of the J-th key frame (the offset position from the head of the M-th divided content data) (that is, F_OFFSET=F0_OFFSET−C_OFFSET) (step S77), and specifies the calculated offset position F_OFFSET and the data size F_SIZE of the J-th key frame obtained in the step S71 as key frame information corresponding to the J-th key frame (step S78).

As described above, in the first embodiment, according to the content data special playback instruction from the user, the user node specifies key frame information corresponding to a key frame to be reproduced and the content ID of divided content data including the key frame on the basis of the content catalog information, obtains the key frame on the basis of the key frame information and the content ID specified from a content holding node which holds the key frame, and reproduces the key frame. Consequently, even in the case where content data in a single unit is divided in a plurality of pieces and divided content data is stored so as to be distributed in a plurality of nodes Nn, special playback can be executed smoothly.

Since the content catalog information is distributed to each of nodes Nn in advance before reproduction of content data, key frame information and the like can be immediately retrieved. The special playback can be executed more efficiently on divided content data.

The content distributed-storage system S in the foregoing embodiments has been described on precondition that it is formed by an algorithm using a DHT, but the invention is not limited to the embodiment. For example, at the time of performing the special playback, each of nodes Nn may transmit a content ID specified from content catalog information to a management server that manages content IDs of all of divided content data (as described above, the content IDs may not be obtained by a hash function) and node information corresponding to the content IDs (that is, the IP addresses and port numbers of content holding nodes that hold the content data corresponding to the content IDs), obtain node information corresponding to the content ID from the management server, and request the content holding node for a key frame.

Second Embodiment

Also in the second embodiment, first, in the case where the controller 11 receives a content list display instruction via the input unit 21 from the user in a node Nn (user node) participating in the content distributed-storage system S, the controller 11 reads the content catalog information from the storage 12, loads it to the RAM, and displays a content list in which a plurality of content names (content titles) included in the content catalog information are written on the display unit 16. In the case where the user selects one of the content names in the displayed content list via the input unit 21, the controller 11 generates a message (query) for inquiring (retrieving) the location of content including the content ID of divided content data A1 as a component of content data A corresponding to the content name and the node information of the node itself. The controller 11 transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node. The user node sends a content transmission request to the content holding node that stores the divided content data A1 in accordance with the obtained node information, for example, receives packet data of the divided content data A1 which is streaming-distributed, obtains the key frame information included in the header of the divided content data A1 (stores it in, for example, the RAM), and reproduces (normal playback) the key frame data via the decoder 14, the video processor 15, the sound processor 17, and the like. As described above, the object to be streaming-distributed changes in order of the divided content data A1, the divided content data A2, the divided content data A3, . . . .

Alternatively, before sending the content transmission request to the content holding node and receiving distribution of the divided content data A1, the user node may send a request for transmitting key frame information included in the header of the divided content data A1, download the key frame information from the content holding node, and store it.

In the case of using the content catalog information and the header of divided content data (structure example 3) shown in FIG. 15, since only the content ID of the divided content data at the head is included, the content ID of any of the other divided content data is calculated by, for example, substituting the order from the head divided content data and the content ID of the head divided content data into a predetermined function.

Since the fast-forward playback or reverse playback process shown in FIG. 27 and the seek (jump) reproducing process shown in FIG. 28 are similar to those of the first embodiment, the description will not be repeated.

Next, the details of the process of specifying the content ID and key frame information in the steps S4 and S12 in the case of using the content catalog information and the header of divided content data in the structure examples 1 to 3 in the second embodiment will now be described.

(The Case of Using Content Catalog Information and Header of Divided Content Data of Structure Example 1)

In this case, as shown in FIG. 29, first, the controller 11 refers to the obtained key frame information, and obtains an offset position F0_OFFSET (offset position from the head of content data) of the J-th key frame and data size F_SIZE of the key frame from the J-th key frame information (step S51).

Subsequently, the controller 11 sets "1" to a variable "M" (step S52). The controller 11 refers to the content catalog information shown in FIG. 13, obtains data size C_SIZE and content ID of the M-th divided content data (in the case of M=1, the head divided content data) from the content information, and calculates an offset position C_OFFSET (in the case of M=1, "0") of the M-th divided content data (step S53).

After that, the controller 11 determines whether the J-th key frame is included in the M-th divided content data or not (step S54). Concretely, the controller 11 determines whether F0_OFFSET<C_OFFSET+C_SIZE is satisfied or not (that is, whether the position indicated by C_OFFSET+C_SIZE (the end position of the M-th divided content data) is larger than (behind) the offset position F0_OFFSET of the J-th key frame or not).

In the case where the J-th key frame is not included in the M-th divided content data (that is, in the case where F0_OFFSET<C_OFFSET+C_SIZE is not satisfied) (N in step S54), the controller 11 adds "1" to "M" (step S55), returns to step S53, calculates the offset position C_OFFSET of the M-th divided content data, obtains the data size C_SIZE and the content ID of the M-th divided content data, and performs processes similar to the above. In such a manner, on the basis of the data size C_SIZE of the divided content data, the offset position F0_OFFSET of the J-th key frame, and the like, divided content data including the J-th key frame is determined.

In the case where the J-th key frame is included in the M-th divided content data (that is, F0_OFFSET<C_OFFSET+C_SIZE is satisfied) (Y in step S54), the controller 11 specifies the content ID of the M-th divided content data (the content ID obtained at last) as the content ID of the divided content data corresponding to the J-th key frame (step S56).

Subsequently, the controller 11 calculates the offset position F_OFFSET of the J-th key frame (the offset position from the head of the M-th divided content data) (that is, F_OFFSET=F0_OFFSET−C_OFFSET) (step S57), and specifies the calculated offset position F_OFFSET and the data size F_SIZE of the J-th key frame obtained in the step S51 as key frame information corresponding to the J-th key frame (step S58).

(The Case of Using Content Catalog Information and Header of Divided Content Data of Structure Example 2)

In this case, as shown in FIG. 30, first, the controller 11 refers to the obtained key frame information and obtains the content ID of divided content data, an offset position F_OFFSET (offset position from the head of divided content data) of the J-th key frame, and data size F_SIZE from the J-th key frame information (step S61). The controller 11 specifies the obtained content ID as the content ID of divided content data corresponding to the J-th key frame, and specifies the offset position F_OFFSET and the data size F_SIZE of the obtained J-th key frame as key frame information corresponding to the J-th key frame (step S62).

(The Case of Using Content Catalog Information and Header of Divided Content Data of Structure Example 3)

In this case, as shown in FIG. 31, first, the controller 11 refers to the obtained key frame information and obtains the offset position F0_OFFSET (offset position from the head of content data) of the J-th key frame and data size F_SIZE of the key frame from the J-th key frame information (step S71).

Subsequently, the controller 11 sets "1" to the variable "M", refers to the content catalog information shown in FIG. 15, and obtains divided data size C_SIZE and the content ID of the divided content data at the head from the divided content information (step S72).

After that, the controller 11 calculates an offset position C_OFFSET (in the case of M=1, "0") of the M-th divided content data (in the case where M=1, the head divided content data) (step S73).

The controller 11 determines whether the J-th key frame is included in the M-th divided content data or not (step S74). Like the step S54, concretely, the controller 11 determines whether F0_OFFSET<C_OFFSET+C_SIZE is satisfied or not.

In the case where the J-th key frame is not included in the M-th divided content data (that is, in the case where F0_OFFSET<C_OFFSET+C_SIZE is not satisfied) (N in step S74), the controller 11 adds "1" to "M", calculates the content ID of the M-th divided content data from the content ID of the divided content data at the head in accordance with a predetermined rule (step S75), and returns to step S73.

When it is set so that content IDs of a plurality of pieces of divided content data constructing content data of a single unit have regularity, the content ID of divided content data other than the head divided content data can be calculated by substituting the order M from the head of the divided content data and the content ID of the head divided content data to a predetermined function (in a simple example, a value obtained by adding M×A (A is an arbitrary value) to the content ID at the head (M=1) becomes the content ID of the M-th (M≥2) divided content data).

In the case where the J-th key frame is included in the M-th divided content data (that is, F0_OFFSET<C_OFFSET+C_SIZE is satisfied) (Y in step S74), the controller 11 specifies the content ID of the M-th divided content data (the content ID obtained or calculated at last) as the content ID of the divided content data corresponding to the J-th key frame (step S76).

Subsequently, the controller 11 calculates the offset position F_OFFSET of the J-th key frame (the offset position from the head of the M-th divided content data) (that is, F_OFFSET=F0_OFFSET−C_OFFSET) (step S77), and specifies the calculated offset position F_OFFSET and the data size F_SIZE of the J-th key frame obtained in the step S71 as key frame information corresponding to the J-th key frame (step S78).

As described above, in the second embodiment, key frame information including information indicative of the offset position of a key frame in each divided content data is included in the header of at least one piece of divided content data constructing content data of a single unit. According to the content data special playback instruction from the user, the user node specifies key frame information corresponding to a key frame to be reproduced and the content ID of divided content data including the key frame to be reproduced, obtains the key frame on the basis of the key frame information and the content ID specified from a content holding node which holds the key frame, and reproduces the key frame. Consequently, even in the case where content data in a single unit is divided in a plurality of pieces and divided content data is stored so as to be distributed in a plurality of node devices, special playback such as fast-forward playback, reverser playback, seek playback, or the like can be executed smoothly. The key frame information or the like can be immediately taken from the header of divided content data, and the special playback can be executed more efficiently on the divided content data.

A method of making key frame information included in content catalog information may be also employed. In this method, as the number of pieces of content increases, the data size of the content catalog information increases, and larger storage capacity is required in a node Nn. However, by making key frame information included in the header of divided content data, the storage capacity in a node Nn can be suppressed.

The special playback process in a node Nn has been described with reference to FIGS. 29 to 31 in the foregoing embodiment on precondition of reproducing divided content data from the head. The special playback process is similarly performed also in the case where playback is performed from divided content data other than the head divided content data. The intermediate playback process in the case where key frame information is included in the header of the head divided content data and that in the case where key frame information is included in the headers of all of divided content data are slightly different from each other. Description will be given while comparing the cases with each other with reference to FIGS. 32 and 33.

In both of the cases, in the case where the controller 11 receives a content list display instruction via the input unit 21 from the user in a node Nn (user node), the controller 11 reads the content catalog information from the storage 12, loads it to the RAM, and displays a content list in which a plurality of content names (content titles) included in the content catalog information are written on the display unit 16.

In the case where key frame information is included only in the header of the divided content data at the head, as shown in FIG. 32, when the user selects one of the content names in the displayed content list via the input unit 21 and a halfway position in the content data A to be reproduced is designated, the controller 11 of the user node obtains the content ID of the head divided content data A1 in the content data A corresponding to the content name (step S101), generates a message (query) for inquiring (retrieving) the location of content including the obtained content ID and the node information of the node itself, and transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node.

The controller 11 of the user node sends a request to transmit key frame information included in the header of the divided content data A1 to the content holding node that stores the divided content data A1 in accordance with the obtained node information, downloads the key frame information from the content holding node, and stores it (step S102).

Subsequently, the controller 11 of the user node obtains the content ID of divided content data (for example, A3 other than A1) corresponding to the halfway reproduction position in the content data A, generates a message (query) for inquiring (retrieving) the location of content including the obtained content ID and the node information of the node itself, and transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node. The controller 11 of the user node sends a content transmission request to the content holding node that stores the divided content data A3, receives the divided content data A3 distributed from the content holding node, and performs halfway playback (step S103).

On the other hand, in the case where key frame information is included in the headers of all of the divided content data, as shown in FIG. 33, when the user selects one of the content names in the displayed content list via the input unit 21 and a halfway position in the content data A to be reproduced is designated, the controller 11 of the user node obtains the content ID of divided content data (for example, A3 other than A1) in the halfway position to be reproduced in the content data A corresponding to the content name (step S201), generates a message (query) for inquiring (retrieving) the location of content including the obtained content ID and the node information of the node itself, and transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node.

The controller 11 of the user node sends a request to transmit key frame information included in the header of the divided content data A3 to the content holding node that stores the divided content data A3 in accordance with the obtained node information, downloads the key frame information from the content holding node, and stores it (step S202).

Subsequently, the controller 11 of the user node sends a content transmission request to the content holding node that stores the divided content data A3, receives the divided content data A3 distributed from the content holding node, and performs midpoint playback (step S203).

By making key frame information included only in the header of the head divided content data as described above, there is an advantage such that the data size of entire content data can be reduced. However, in the case of performing mid point play back, when key frame information is included in the headers of all of divided content data, it is unnecessary to obtain the key frame information from a content holding node that stores the head divided content data, but the key frame information can be obtained promptly. Therefore, the special playback of the content data can be executed smoothly.

The content distributed-storage system S in the foregoing embodiment has been described on precondition that it is formed by an algorithm using a DHT, but the invention is not limited to the embodiment. For example, at the time of performing the special playback, each of nodes Nn may transmit a content ID specified from content catalog information to a management server that manages content IDs of all of divided content data (as described above, the content IDs may not be obtained by a hash function) and node information corresponding to the content IDs (that is, the IP addresses and port numbers of content holding nodes that hold the content data corresponding to the content IDs), obtain node information corresponding to the content ID from the management server, and request the content holding node for a key frame.

Although the case where key frame information is included in the header of divided content data has been described as an example in the foregoing embodiment, the invention is not limited to the case. Key frame information may be included in a location out of the header.

Third Embodiment

In a third embodiment, first, in the case where the controller 11 receives a content list display instruction via the input unit 21 from the user in a node Nn (user node) participating in the content distributed-storage system S, the controller 11 reads the content catalog information from the storage 12, loads it to the RAM, and displays a content list in which a plurality of content names (content titles) included in the content catalog information are written on the display unit 16. In the case where the user selects one of the content names in the displayed content list via the input unit 21, first, the controller 11 generates a message (query) for inquiring (retrieving) the location of content including the content ID of a key frame information file corresponding to content data A corresponding to the content name and the node information of the node itself. The controller 11 transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node. The user node sends a key frame information transmission request to the content holding node that stores the key frame information file in accordance with the obtained node information, and obtains the key frame information file (downloads it and stores into the RAM).

Subsequently, the controller 11 of the user node generates a message (query) for inquiring (retrieving) the location of content including the content ID of divided content data A1 as a part of the content data A and the node information of the node itself. The controller 11 transmits the message to another node Nn in accordance with a routing table using the DHT of the controller 11 itself. The content location inquiry (retrieval) message finally reaches the root node by DHT routing using the content ID as a key, and the user node obtains node information of the content holding node from the root node. The user node sends a content transmission request to the content holding node that stores the divided content data A1 in accordance with the obtained node information, for example, receives packet data of the divided content data A1 which is streaming-distributed, and reproduces (normal playback) the packet data via the decoder 14, the video processor 15, the sound processor 17, and the like. In such a manner, as described above, the object to be streaming-distributed changes in order of the divided content data A1, the divided content data A2, the divided content data A3, . . . .

In the third embodiment, in the case of using the content catalog information and the key frame information file (structure example 3) shown in FIG. 22, since only the content ID of the key frame information file is included in the content catalog information, the content ID of any of the divided content data can be calculated by, for example, substituting the order from the head divided content data and the content ID of the key frame information file into a predetermined function.

Since the fast-forward playback or reverse playback process shown in FIG. 27 and the seek (jump) reproducing process shown in FIG. 28 are similar to those of the first embodiment, the description will not be repeated.

Next, the details of the process of specifying the content ID and key frame information in the steps S4 and S12 in the case of using the content catalog information and the key frame information file in the structure examples 1 to 3 in the third embodiment will now be described.

(The Case of Using Content Catalog Information and Key Frame Information File of Structure Example 1)

In this case, as shown in FIG. 29, first, the controller 11 refers to the obtained key frame information file, and obtains an offset position F0_OFFSET (offset position from the head of content data) of the J-th key frame information and data size F_SIZE of the key frame from the J-th key frame information (step S51).

Subsequently, the controller 11 sets "1" to a variable "M" (step S52). The controller 11 refers to the content catalog information shown in FIG. 20, obtains data size C_SIZE and content ID of the M-th divided content data (in the case of M=1, the head divided content data) from the divided content information, and calculates an offset position C_OFFSET (in the case of M=1, "0") of the M-th divided content data (step S53).

After that, the controller 11 determines whether the J-th key frame is included in the M-th divided content data or not (step S54). Concretely, the controller 11 determines whether F0_OFFSET<C_OFFSET+C_SIZE is satisfied or not (that is, whether the position indicated by C_OFFSET+C_SIZE (the end position of the M-th divided content data) is larger than (behind) the offset position F0_OFFSET of the J-th key frame or not).

In the case where the J-th key frame is not included in the M-th divided content data (that is, in the case where F0_OFFSET<C_OFFSET+C_SIZE is not satisfied) (N in step S54), the controller 11 adds "1" to "M" (step S55), returns to step S53, calculates the offset position C_OFFSET of the M-th divided content data, obtains the data size C_SIZE and the content ID of the M-th divided content data, and performs processes similar to the above. In such a manner, on the basis of the data size C_SIZE of the divided content data, the offset position F0_OFFSET of the J-th key frame, and the like, divided content data including the J-th key frame is determined.

In the case where the J-th key frame is included in the M-th divided content data (that is, F0_OFFSET<C_OFFSET+C_SIZE is satisfied) (Y in step S54), the controller 11 specifies the content ID of the M-th divided content data (the content ID obtained at last) as the content ID of the divided content data corresponding to the J-th key frame (step S56).

Subsequently, the controller 11 calculates the offset position F_OFFSET of the J-th key frame (the offset position from the head of the M-th divided content data) (that is, F_OFFSET=F0_OFFSET−C_OFFSET) (step S57), and specifies the calculated offset position F_OFFSET and the data size F_SIZE of the J-th key frame obtained in the step S51 as key frame information corresponding to the J-th key frame (step S58).

(The Case of Using Content Catalog Information and Key Frame Information File of Structure Example 2)

In this case, as shown in FIG. 30, first, the controller 11 refers to the obtained key frame information and obtains the content ID of divided content data, an offset position F_OFFSET (offset position from the head of divided content data) of the J-th key frame, and data size F_SIZE from the J-th key frame information (step S61). The controller 11 specifies the obtained content ID as the content ID of divided content data corresponding to the J-th key frame, and specifies the offset position F_OFFSET and the data size F_SIZE of the obtained J-th key frame as key frame information corresponding to the J-th key frame (step S62).

(The Case of Using Content Catalog Information and Key Frame Information File of Structure Example 3)

In this case, as shown in FIG. 34, first, the controller 11 refers to the obtained key frame information file and obtains the offset position F0_OFFSET (offset position from the head of content data) of the J-th key frame and data size F_SIZE of the key frame from the J-th key frame information (step S81).

Subsequently, the controller 11 sets "1" to the variable "M", obtains divided data size C_SIZE and the content ID of the key frame information file from the divided content information with reference to the content catalog information shown in FIG. 22, and calculates the content ID of the head divided content data from the content ID of the key frame information file in accordance with a predetermined rule (step S82).

After that, the controller 11 calculates an offset position C_OFFSET (in the case of M=1, "0") of the M-th divided content data (in the case where M=1, the head divided content data) (step S83).

The controller 11 determines whether the J-th key frame is included in the M-th divided content data or not (step S84). Like the step S54, concretely, the controller 11 determines whether F0_OFFSET<C_OFFSET+C_SIZE is satisfied or not.

In the case where the J-th key frame is not included in the M-th divided content data (that is, in the case where F0_OFFSET<C_OFFSET+C_SIZE is not satisfied) (N in step S84), the controller 11 adds "1" to "M", calculates the content ID of the M-th divided content data from the content ID of the key frame information file in accordance with a predetermined rule (step S85), and returns to step S83.

When it is set so that content IDs of a plurality of pieces of divided content data constructing content data of a single unit and the content ID of the key frame information file have regularity, the content ID of each divided content data can be calculated by substituting the order M from the head of the divided content data and the content ID of the key frame information file to a predetermined function (in a simple example, a value obtained by adding M×A (A is an arbitrary value) to the content ID of the key frame information file becomes the content ID of the M-th (M≥1) divided content data).

In the case where the J-th key frame is included in the M-th divided content data (that is, F0_OFFSET<C_OFFSET+C_SIZE is satisfied) (Y in step S84), the controller 11 specifies the content ID of the M-th divided content data (the content ID calculated at last) as the content ID of the divided content data corresponding to the J-th key frame (step S86).

Subsequently, the controller 11 calculates the offset position F_OFFSET of the J-th key frame (the offset position from the head of the M-th divided content data) (that is, F_OFFSET=F0_OFFSET−C_OFFSET) (step S87), and specifies the calculated offset position F_OFFSET and the data size F_SIZE of the J-th key frame obtained in the step S81 as key frame information corresponding to the J-th key frame (step S88).

As described above, in the third embodiment, the user node obtains a key frame information file stored in a content holding node, according to a content data special playback instruction from the user, specifies key frame information corresponding to a key frame to be reproduced from the key frame information file, specifies the content ID of divided content data including the key frame to be reproduced, obtains the key frame on the basis of the key frame information and the content ID specified from a content holding node which holds the key frame, and reproduces the key frame. Consequently, even in the case where content data in a single unit is divided in a plurality of pieces and divided content data is stored so as to be distributed in a plurality of node devices, special playback such as fast-forward playback, reverser playback, seek playback, or the like can be executed smoothly. The key frame information or the like can be immediately taken from the key frame information file, and the special playback can be executed more efficiently on the divided content data.

A method of making key frame information included in content catalog information may be also employed. In this method, as the number of pieces of content increases, the data size of the content catalog information increases, and larger storage capacity is required in a node Nn. However, by making key frame information included in the key frame information file, the storage capacity in a node Nn can be suppressed.

The content distributed-storage system S in the foregoing embodiment has been described on precondition that it is formed by an algorithm using a DHT, but the invention is not limited to the embodiment. For example, at the time of performing the special playback, each of nodes Nn may transmit a content ID specified from content catalog information to a management server that manages content IDs of all of divided content data (as described above, the content IDs may not be obtained by a hash function) and node information corresponding to the content IDs (that is, the IP addresses and port numbers of content holding nodes that hold the content data corresponding to the content IDs), obtain node information corresponding to the content ID from the management server, and request the content holding node for a key frame.

In the foregoing embodiment, a key frame information file corresponding to content data is stored so as to be distributed to a plurality of nodes Nn and is set so that the key frame information can be found by another node Nn later using the content ID of the key frame information file as a key. Another example may be employed such that key frame information files are managed by a management server and, according to a request accompanying a content ID from the node Nn, the management server provides a key frame information file corresponding to the content ID.

The present invention is not confined to the configuration listed in the foregoing embodiments, but it is easily understood that the person skilled in the art can modify such configurations into various other modes, within the scope of the present invention described in the claims.

The invention claimed is:

1. A node device for use in a distributed content storage system, the node device comprising:
    a storing unit that stores content catalog information wherein the content catalog information includes unique identification information of divided content data and key frame information, wherein the divided content data includes a key frame obtained by compressing an image frame and compressed differential data obtained by compressing differential information between image frames, and key frame information includes information indicative of a position from a head of the divided content data, of the key frame included in the divided content data;
    an instruction receiving unit that receives an instruction indicative of playing back the content data;
    a determining unit configured to determine the key frame information of the key frame included in the divided content data and the unique identification information of the divided content data on the basis of the content catalog information in accordance with the instruction; and
    a frame obtaining unit configured to obtain the key frame on the basis of the determined key frame information and the determined unique identification information,
    wherein the distributed content storage system stores the divided content data in a plurality of node devices comprising a peer-to-peer communication system in a distributed manner, the divided content data being obtained by dividing content data including the image frames, and the content data being constituted by the divided content data, and
    wherein the unique identification information is assigned to each of the divided content data and each of the node devices can obtain the divided content data on the basis of the unique identification information.

2. The node device according to claim 1, wherein the instruction indicative of playing back is a playback instruction including any of fast-forward playback, reverse playback, and seek playback.

3. The node device according to claim 1, wherein the content catalog information includes the unique identification information of the divided content data, and further, information indicative of data sizes of the divided content data,
the key frame information further includes information indicative of a data size of the key frame, and
the determining unit determines the divided content data wherein the content data includes the key frame on the basis of the information indicative of the data size of the divided content data and the key frame information.

4. The node device according to claim 1, wherein the content catalog information includes the unique identification information of the divided content data, and the unique identification information and the key frame information are associated with each other.

5. The node device according to claim 1, wherein the unique identification information is assigned to the divided content data in accordance with a predetermined rule,
the content catalog information includes the unique identification information of a head of the divided content data out of the plurality of the divided content data, and
the determining unit determines the unique identification information of the divided content data other than the head of the divided content data from the unique identification information of the head of the divided content data in accordance with the predetermined rule.

6. A non-transitory computer-readable recording medium on which is recorded a node process program to be performed in a node device for use in a distributed content storage system, the node process program comprising:
receiving an instruction indicative of playing back of content data;
determining key frame information of a key frame included in divided content data and unique identification information of the divided content data on the basis of the content catalog information in accordance with the instruction; and
obtaining the key frame on the basis of the determined key frame information and the determined unique identification information,
wherein the distributed content storage system stores the divided content data in a plurality of node devices comprising a peer-to-peer communication system in a distributed manner, the divided content data being obtained by dividing content data including a plurality of image frames, and the content data being constituted by the divided content data,
wherein the unique identification information is assigned to each of the divided content data and each of the node devices can obtain the divided content data on the basis of the unique identification information, and
wherein the node device comprises a storing unit that stores the content catalog information,
wherein the content catalog information includes the unique identification information of the divided content data and key frame information, and
wherein the divided content data includes the key frame obtained by compressing the image frame and compressed differential data obtained by compressing differential information between the image frames and the key frame information includes information indicative of a position from a head of the divided content data, of the key frame included in the plurality of the divided content data.

7. A frame image obtaining method for use in a distributed content storage system, the method comprising:
receiving an instruction indicative of playing back content data;
determining key frame information of a key frame included in divided content data and unique identification information of the divided content data on the basis of the content catalog information in accordance with the instruction; and
obtaining the key frame on the basis of the key frame information and the determined unique identification information,
wherein the distributed content storage system stores the divided content data in a plurality of node devices comprising a peer-to-peer communication system in a distributed manner, the divided content data being obtained by dividing content data including a plurality of image frames, and the content data being constituted by the divided content data,
wherein the unique identification information is assigned to each of the divided content data and each of the node devices can obtain the divided content data on the basis of the unique identification information, and
wherein the node device comprises a storing unit that stores the content catalog information,
wherein the content catalog information includes the unique identification information of the divided content data and key frame information, and
wherein the divided content data includes the key frame obtained by compressing the image frame and compressed differential data obtained by compressing differential information between the image frames and the key frame information includes information indicative of a position from a head of the divided content data, of the key frame included in the plurality of the divided content data.

8. A distributed content storage system comprising a plurality of nodes, each node device comprising:
a storing unit that stores content catalog information wherein the content catalog information includes unique identification information of divided content data and key frame information, wherein the divided content data includes a key frame obtained by compressing an image frame and compressed differential data obtained by compressing differential information between image frames, and key frame information includes information indicative of a position from a head of the divided content data of the key frame included in of the plurality of the divided content data;
an instruction receiving unit that receives an instruction indicative of playing back the content data;
a determining unit configured to determine the key frame information of the key frame included in the divided content data and the unique identification information of the divided content data on the basis of the content catalog information in accordance with the instruction; and
a frame obtaining unit configured to obtain the key frame on the basis of the determined the key frame information and the determined unique identification information, wherein the distributed content storage system stores the divided content data in the plurality of node devices comprising a peer-to-peer communication system in a distributed manner, the divided content data being obtained by dividing content data including the image frames, and the content data being constituted by the divided content data, and wherein the unique identification information is assigned to the divided content data and the node devices can obtain the divided content data on the basis of the unique identification information.

9. A node device for use in a distributed content storage system, the node device comprising: a memory;

a key frame information obtaining unit configured to obtain key frame information from divided content data, wherein the divided content data includes a key frame obtained by compressing an image frame and compressed differential data obtained by compressing differential information between image frames, and the key frame information includes information indicative of a position from a head of the divided content data of the key frame included in the plurality of the divided content data;

an instruction receiving unit that receives an instruction indicative of playing back the content data;

a determining unit configured to determine the key frame information of the key frame included in the divided content data from the key frame information obtained by the key frame information obtaining unit in accordance with the instruction and determine the unique identification information of divided content data; and a frame obtaining unit configured to obtain the key frame on the basis of the determined key frame information and the determined unique identification information, wherein the distributed content storage system stores the divided content data in the plurality of node devices comprising a peer-to-peer communication system in a distributed manner, the divided content data being obtained by dividing content data including the image frames, and the content data being constituted by the divided content data, and wherein the unique identification information is assigned to the divided content data and the node devices can obtain the divided content data on the basis of the unique identification information.

10. The node device according to claim 9, wherein the instruction indicative of playing back is a playback instruction including any of fast-forward playback, reverse playback, and seek playback.

11. The node device according to claim 9, further comprising:

a storing unit that stores content catalog information wherein the content catalog information includes the unique identification information of the divided content data and information indicative of data sizes of the divided content data, wherein the key frame information further includes information indicative of a data size of the key frame, and the determining unit determines the divided content data wherein the content data includes the key frame on the basis of the information indicative of the data size of the divided content data and the key frame information.

12. The node device according to claim 9, wherein the unique identification information of the divided content data is associated with the key frame information, and the determining unit determines the unique identification information of the divided content data, associated with the determined key frame information.

13. The node device according to claim 9, wherein the unique identification information is assigned to the divided content data in accordance with a predetermined rule, and the determining unit obtains the unique identification information of a head of the divided content data from content catalog information distributed to the plurality of node devices, and determines the unique identification information of divided content data other than the head of the divided content data from the unique identification information of the head of the divided content data in accordance with the predetermined rule.

14. The node device according to claim 9, wherein the key frame information is included in the divided content data.

15. The node device according to claim 9, wherein the key frame information is included in the head of the divided content data.

16. A non-transitory computer-readable recording medium on which is recorded a node process program to be performed in a node device for use in a distributed content storage system, the node process program comprising:

obtaining key frame information from divided content data, wherein the divided content data includes a key frame obtained by compressing an image frame and compressed differential data obtained by compressing differential information between image frames, the key frame information including information indicative of a position from a head of the divided content data, of the key frame included in the divided content data;

receiving an instruction indicative of playing back the content data;

determining the key frame information of the key frame included in the divided content data, from the key frame information obtained by the key frame information obtaining unit in accordance with the instruction and determining unique identification information of the divided content data; and obtaining the key frame on the basis of the determined key frame information and the determined unique identification information, wherein the distributed content storage system stores the divided content data in a plurality of node devices comprising a peer-to-peer communication system in a distributed manner, the divided content data being obtained by dividing content data including the image frames, and the content data being constituted by the divided content data, and wherein the unique identification information is assigned to each of the divided content data and each of the node devices can obtain the divided content data on the basis of the unique identification information.

17. A frame image obtaining method for use in a distributed content storage system, the method comprising:

obtaining key frame information from divided content data, wherein the divided content data includes a key frame obtained by compressing an image frame and compressed differential data obtained by compressing differential information between image frames, the key frame information including information indicative of a position from a head of the divided content data of the key frame included in the divided content data;

receiving an instruction indicative of playing back the content data;

determining the key frame information of the key frame included in the divided content data, from the key frame information obtained by the key frame information obtaining unit in accordance with the instruction and determining unique identification information of the divided content data; and obtaining the key frame on the basis of the determined key frame information and the determined unique identification specified, wherein the distributed content storage system stores the divided content data in a plurality of node devices comprising a peer-to-peer communication system in a distributed manner, the divided content data being obtained by dividing content data including the image frames, and the content data being constituted by the divided content data, and wherein the unique identification information is assigned to each of the divided content data and each of the node devices can obtain the divided content data on the basis of the unique identification information.

18. A distributed content storage system comprising a plurality of node devices, each node device comprising: a memory;

a key frame information obtaining unit configured to obtain key frame information from divided content data, wherein the divided content data includes a key frame obtained by compressing an image frame and compressed differential data obtained by compressing differential information between image frames, the key frame information including information indicative of a position from a head of the divided content data of the key frame included in the divided content data;

an instruction receiving unit that receives an instruction indicative of playing back the content data;

a determining unit configured to determine the key frame information of the key frame included in the divided content data, from the key frame information obtained by the key frame information obtaining unit in accordance with the instruction, and determine unique identification information of divided content data; and a frame obtaining unit configured to obtain the key frame on the basis of the determined key frame information and the determined unique identification information, wherein the distributed content storage system stores the divided content data in the plurality of node devices comprising a peer-to-peer communication system in a distributed manner, the divided content data being obtained by dividing content data including the image frames, and the content data being constituted by the divided content data, and wherein the unique identification information is assigned to the divided content data and the node devices can obtain the divided content data on the basis of the unique identification information.

19. A node device for use in a distributed content storage system, the node device comprising: a memory;

a key frame information obtaining unit configured to obtain a file of key frame information from another node device storing the file of the key frame information, wherein divided content data includes a key frame obtained by compressing an image frame and compressed differential data obtained by compressing differential information between image frames, the key frame information including information indicative of a position from a head of the divided content data of the key frame included in the divided content data;

an instruction receiving unit that receives an instruction indicative of playing back of the content data;

a determining unit configured to determine the key frame information of the key frame included in the divided content data from the file of key frame information obtained by the key frame information obtaining unit in accordance with the instruction, and determine unique identification information of divided content data including the key frame; and a frame obtaining unit configured to obtain the key frame on the basis of the determined key frame information and the determined unique identification information, wherein the distributed content storage system stores the divided content data in the plurality of node devices comprising a peer-to-peer communication system in a distributed manner, the divided content data being obtained by dividing content data including the image frames, and the content data being constituted by the divided content data, and wherein the unique identification information is assigned to the divided content data and the node devices can obtain the divided content data on the basis of the unique identification information.

20. The node device according to claim 19, wherein the instruction indicative of playing back is a playback instruction including any of fast-forward playback, reverse playback, and seek playback.

21. The node device according to claim 19, further comprising:

a storing unit that stores content catalog information wherein content catalogue information includes the unique identification information of the divided content data and information indicative of data sizes of the divided content data, wherein the key frame information further includes information indicative of a data size of the key frame, and the determining unit determines the divided content data, wherein the content data includes the key frame, on the basis of the information indicative of the data size of the divided content data and the key frame information.

22. The node device according to claim 19, wherein the unique identification information of the divided content data is associated with the key frame information, and the determining unit determines the unique identification information of the divided content data associated with the specified key frame information.

23. The node device according to claim 19, wherein second unique identification information is assigned to the key frame information, the file of the key frame information is stored in any of the node devices, and the key frame information obtaining unit obtains the file of the key frame information from the other node device on the basis of the second unique identification information.

24. The node device according to claim 23, wherein the second unique identification information is assigned to the key frame information and the unique identification information is assigned to the divided content data in accordance with a predetermined rule, and the determining unit obtains the second unique identification information of the key frame information from content catalog information distributed to the plurality of node devices, and calculates the unique identification information of the divided content data on the basis of the second unique identification information of the key frame information in accordance with the predetermined rule.

25. A non-transitory computer-readable recording medium on which is recorded a node process program to be performed in a node device for use in a distributed content storage system, the node process program comprising:

obtaining a file of key frame information from another node device storing the file of the key frame information, wherein divided content data includes a key frame obtained by compressing an image frame and compressed differential data obtained by compressing differential information between image frames, the key frame information including information indicative of a position from a head of the divided content data of the key frame included in the divided content data;

receiving an instruction indicative of playing back the content data;

determining the key frame information of the key frame included in the divided content data from the file of key frame information obtained by the key frame information obtaining unit in accordance with the instruction, and determining unique identification information of divided content data; and obtaining the key frame on the basis of the determined key frame information and the determined unique identification information, wherein the distributed content storage system stores the divided content data in a plurality of node devices comprising a peer-to-peer communication system in a distributed manner, the divided content data being obtained by dividing content data including the image frames, and the content data being constituted by the divided content data, and wherein the unique identification information is assigned to each of the divided content data and each of the node devices can obtain the divided content data on the basis of the unique identification information.

26. A frame image obtaining method for use in a distributed content storage system, the method comprising:

obtaining a file of key frame information from another node device storing the file of the key frame information, wherein divided content data includes a key frame obtained by compressing an image frame and compressed differential data obtained by compressing differential information between image frames, the key frame information including information indicative of a position from a head of the divided content data of the key frame included in the divided content data;

receiving an instruction indicative of playing back the content data;

determining the key frame information of the key frame included in the divided content data, from the file of the key frame information obtained by the key frame information obtaining unit in accordance with the instruction and determining unique identification information of divided content data; and obtaining the key frame on the basis of the determined key frame information and the determined unique identification information, wherein the distributed content storage system stores the divided content data in a plurality of node devices comprising a peer-to-peer communication system in a distributed manner, the divided content data being obtained by dividing content data including the image frames, and the content data being constituted by the divided content data, and wherein the unique identification information is assigned to each of the divided content data and each of the node devices can obtain the divided content data on the basis of the unique identification information.

27. A distributed content storage system comprising a plurality of node devices, each node device comprising: a memory;

a key frame information obtaining unit configured to obtain a file of key frame information from another node device storing the file of the key frame information, wherein divided content data includes a key frame obtained by compressing an image frame and compressed differential data obtained by compressing differential information between image frames, the key frame information including information indicative of a position from a head of the divided content data, of the key frame included in the plurality of the divided content data;

an instruction receiving unit that receives an instruction indicative of playing back the content data;

a determining unit configured to determine the key frame information of the key frame included in the divided content data from the file of key frame information obtained by the key frame information obtaining unit in accordance with the instruction, and determining unique identification information of divided content data; and a frame obtaining unit configured to obtain the key frame on the basis of the determined key frame information and the determined unique identification information, wherein the distributed content storage system stores the divided content data in the plurality of node devices comprising a peer-to-peer communication system in a distributed manner, the divided content data being obtained by dividing content data including the image frames, and the content data being constituted by the divided content data, and wherein the unique identification information is assigned to the divided content data and the node devices can obtain the divided content data on the basis of the unique identification information.

* * * * *